B. F. AUGUSTINE.
ROTARY ENGINE.
APPLICATION FILED JULY 24, 1916.

1,229,569.

Patented June 12, 1917.
12 SHEETS—SHEET 1.

Inventor
Benjamin F. Augustine
By
Attorney

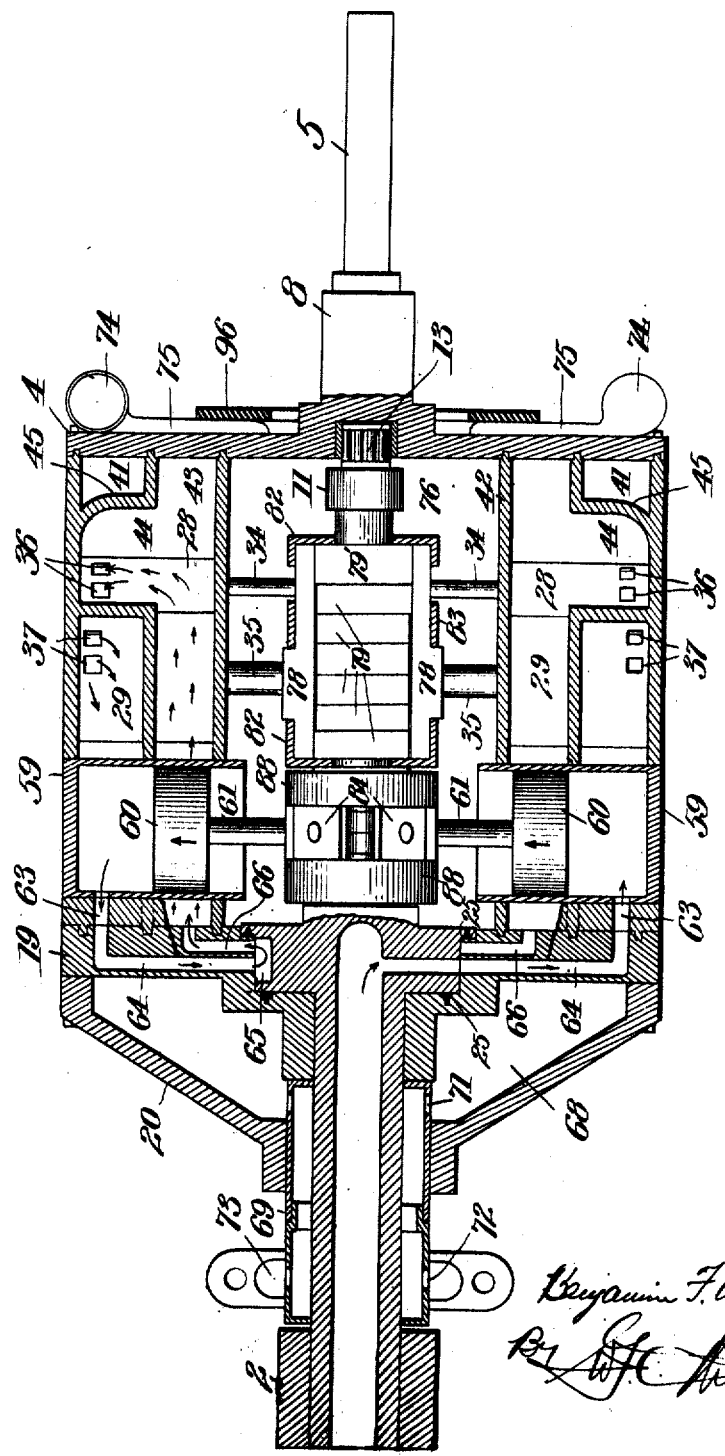

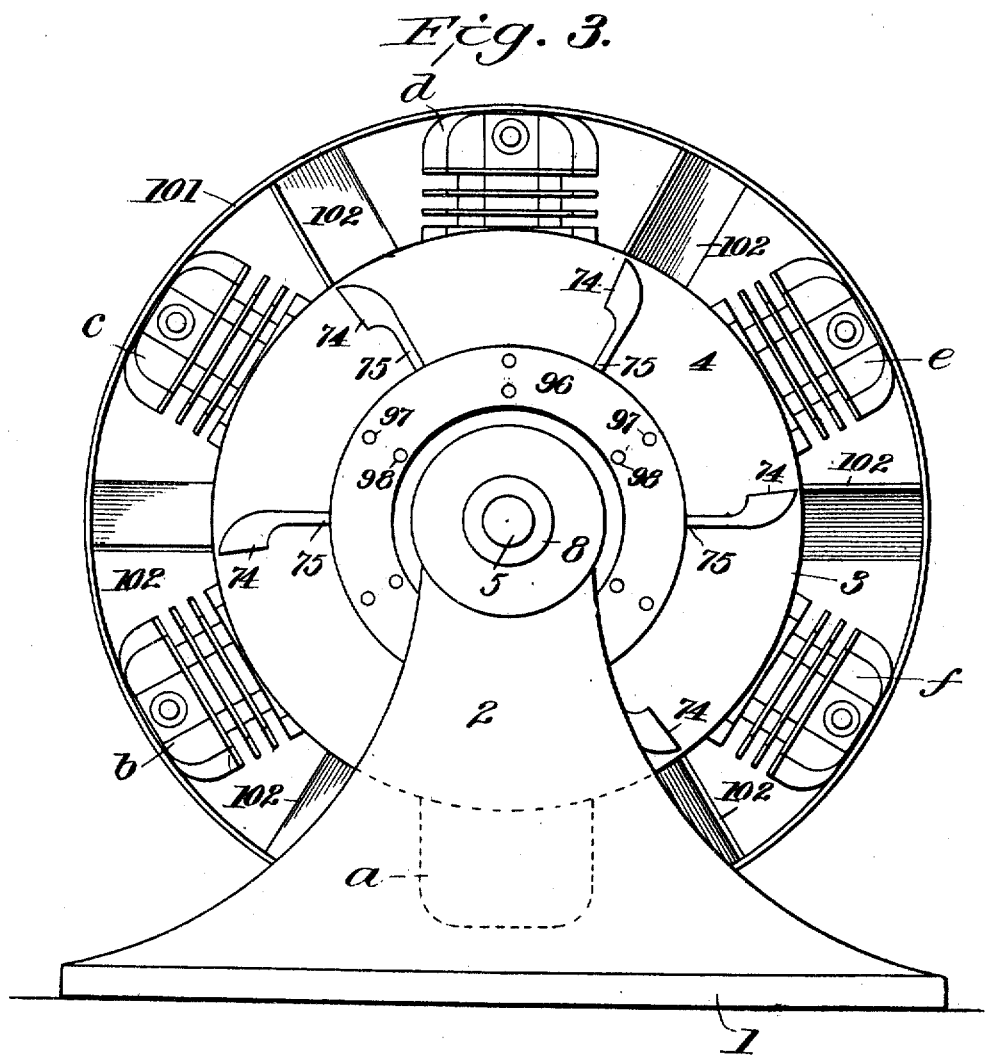

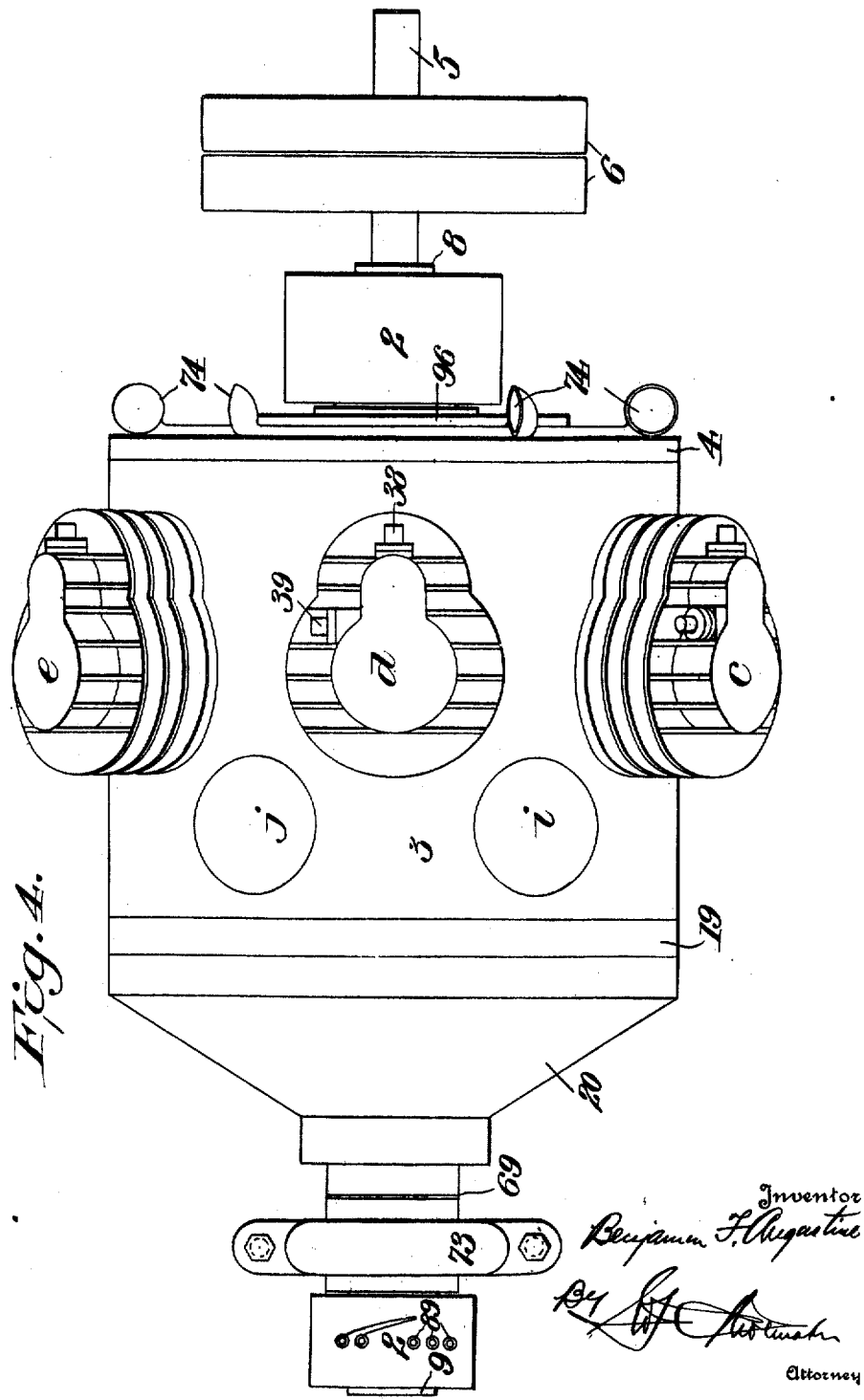

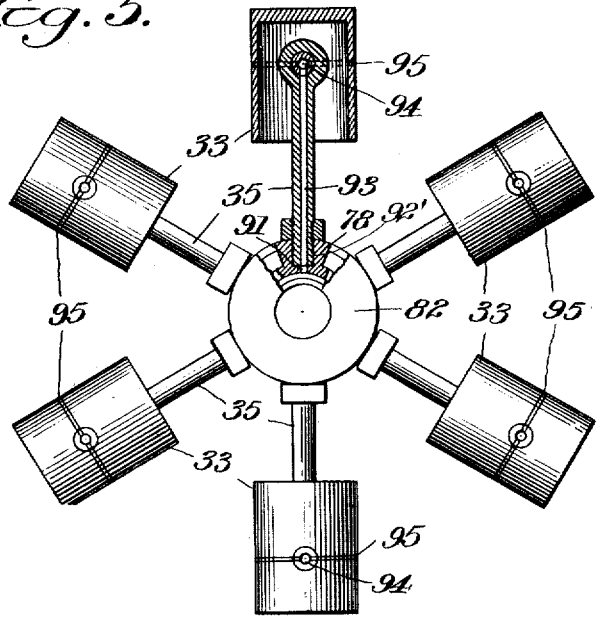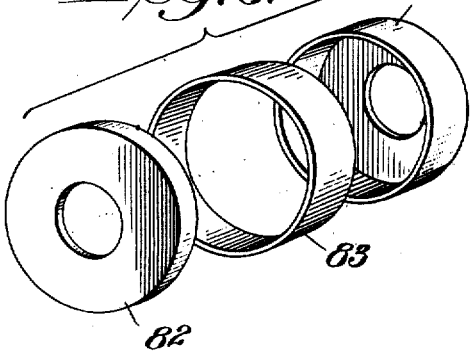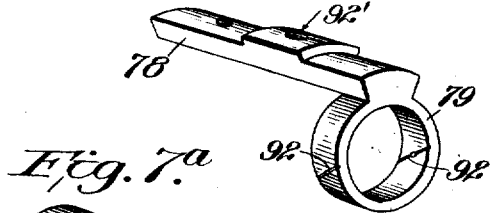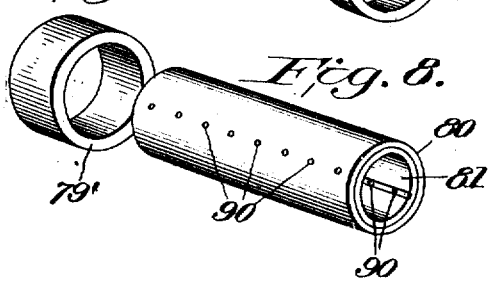

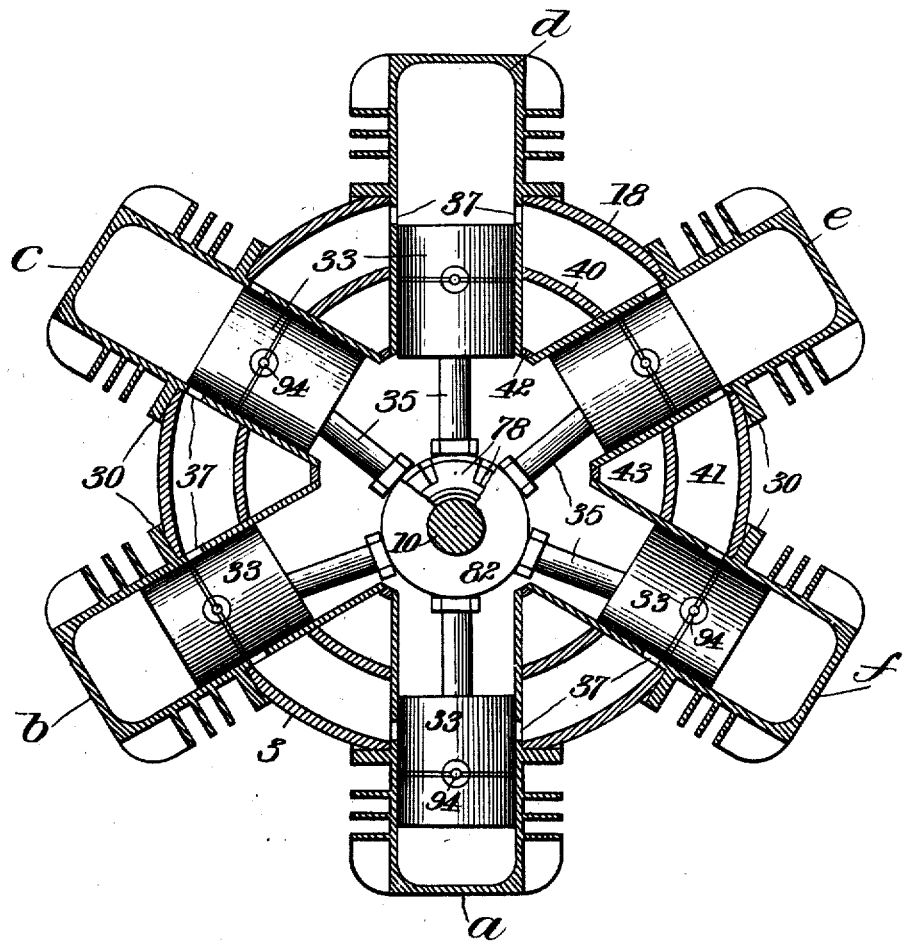

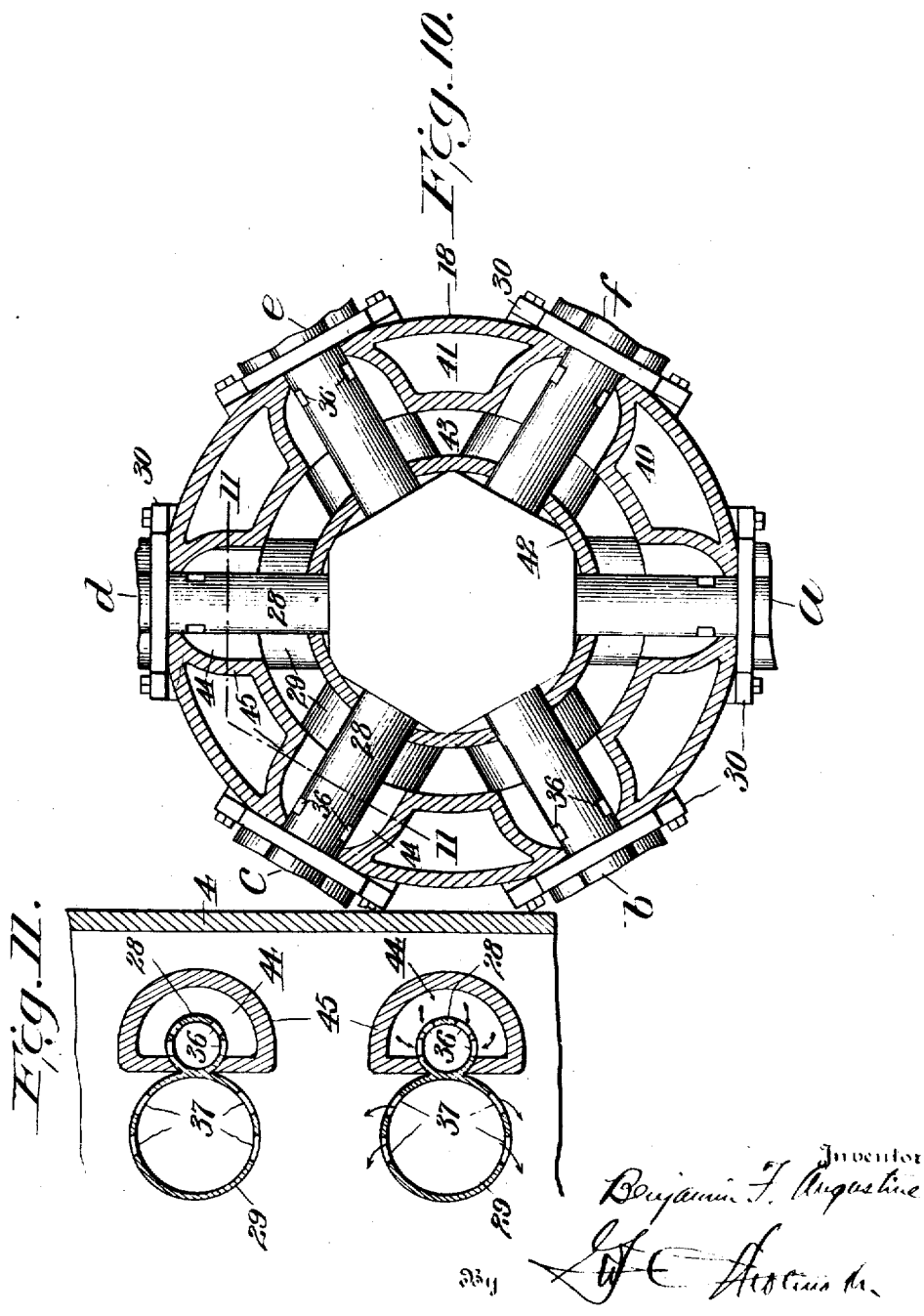

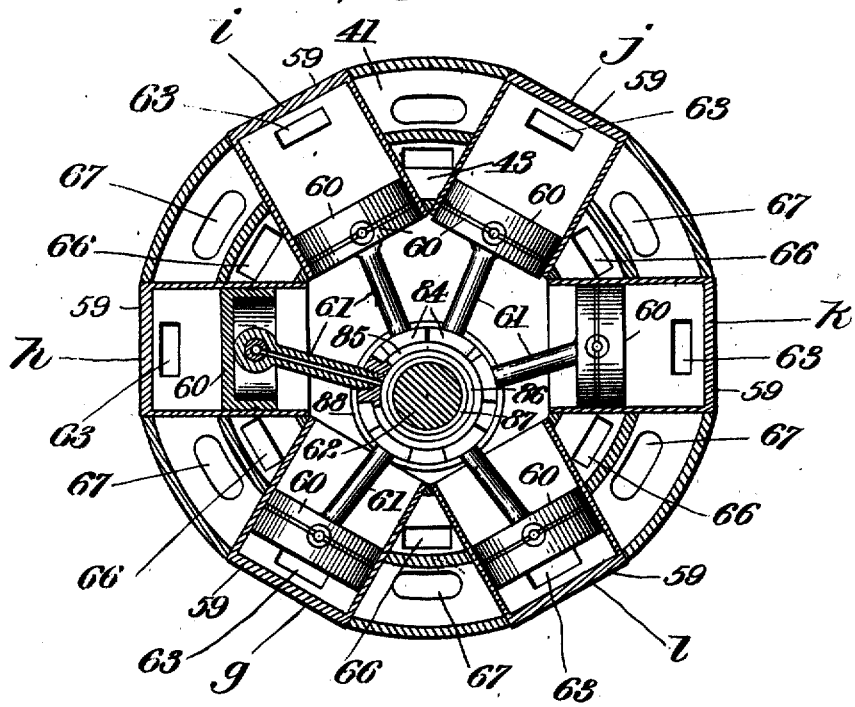

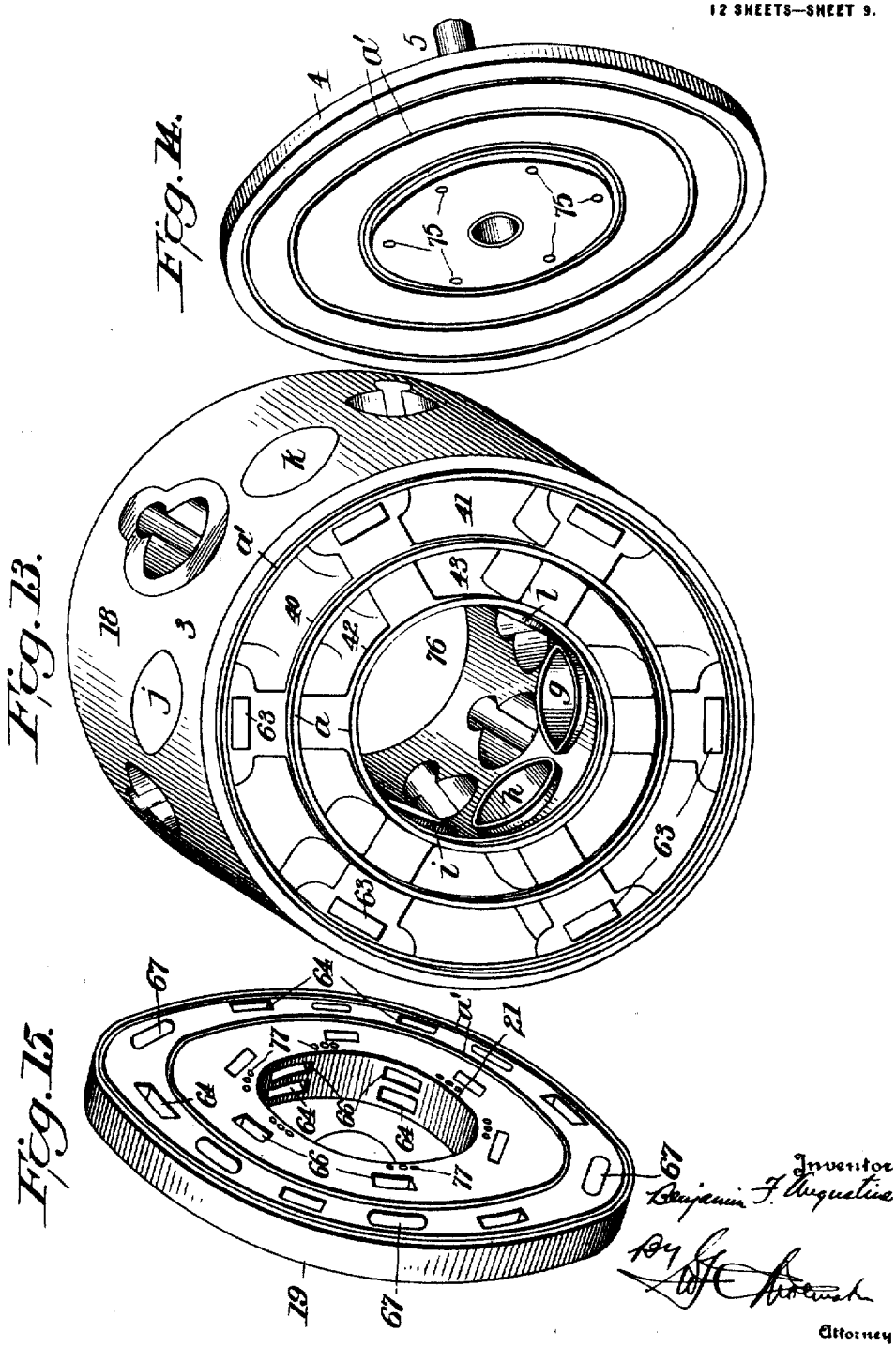

B. F. AUGUSTINE.
ROTARY ENGINE.
APPLICATION FILED JULY 24, 1916.

1,229,569.

Patented June 12, 1917.
12 SHEETS—SHEET 10.

Inventor
Benjamin F. Augustine
By
Attorney

B. F. AUGUSTINE.
ROTARY ENGINE.
APPLICATION FILED JULY 24, 1916.
1,229,569.
Patented June 12, 1917.
12 SHEETS—SHEET 11.
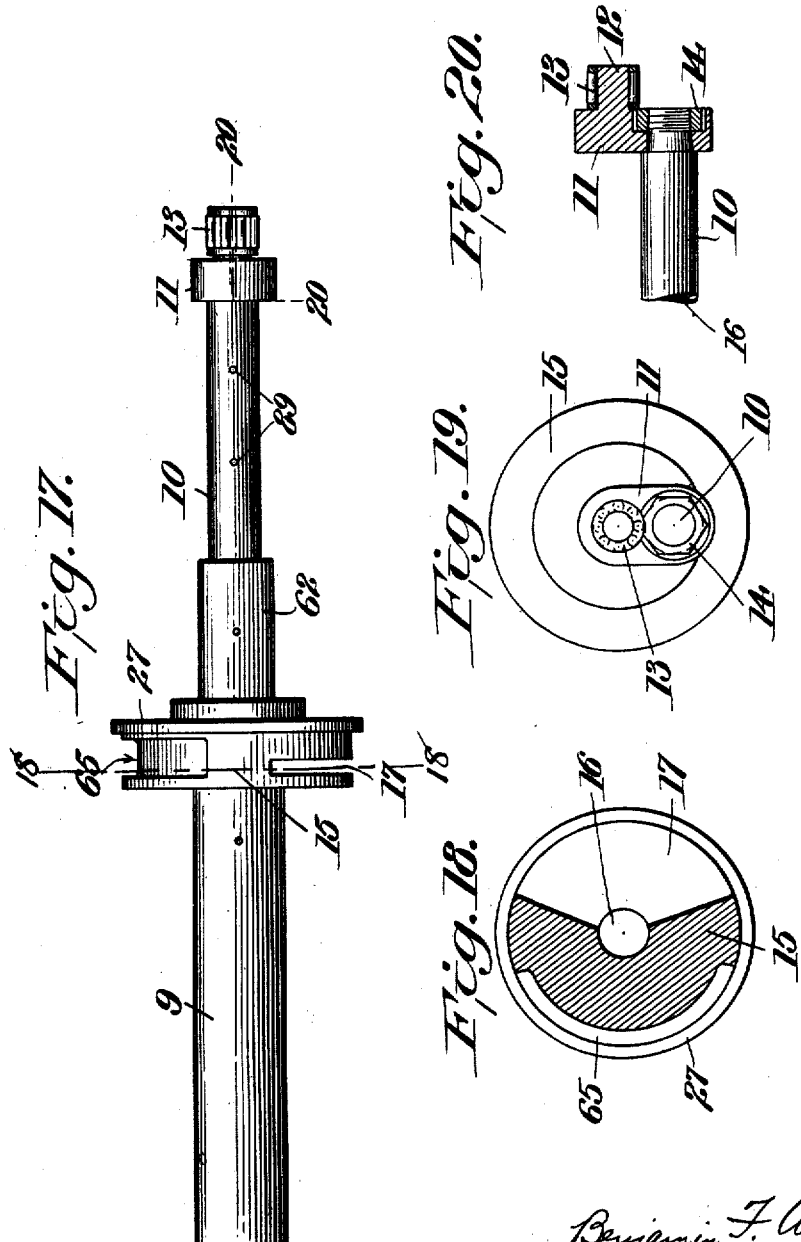
Inventor
Benjamin F. Augustine
By
Attorney

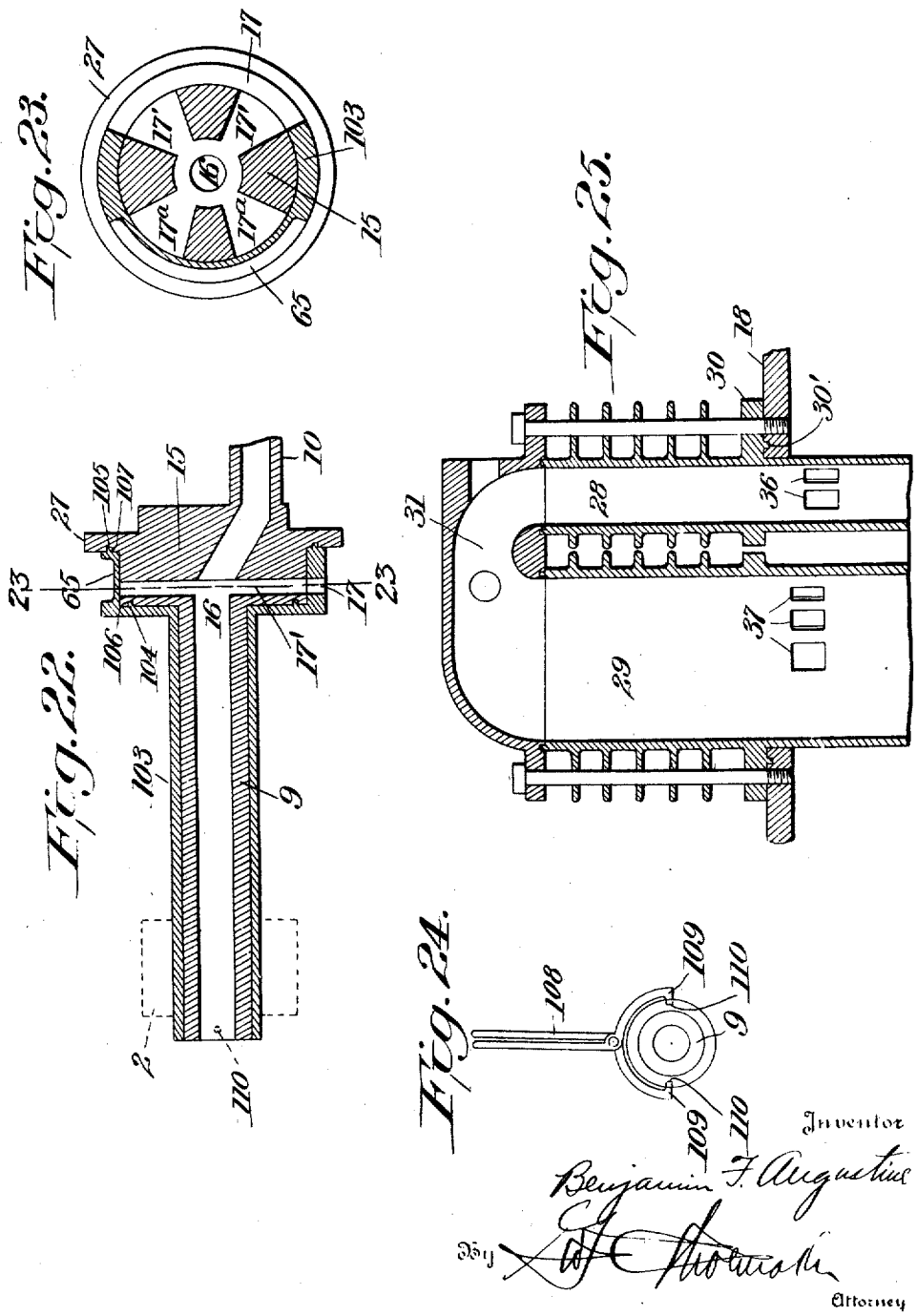

UNITED STATES PATENT OFFICE.

BENJAMIN F. AUGUSTINE, OF BUFFALO, NEW YORK.

ROTARY ENGINE.

1,229,569.  Specification of Letters Patent.  Patented June 12, 1917.

Application filed July 24, 1916. Serial No. 111,054.

*To all whom it may concern:*

Be it known that I, BENJAMIN F. AUGUSTINE, a citizen of the United States, residing at Buffalo, in the county of Erie and State of New York, have invented certain new and useful Improvements in Rotary Engines, of which the following is a specification.

The invention relates broadly to new and useful improvements in gas engines, while in detail the invention relates to a gas engine having a rotating supporting case carrying a plurality of cylinders.

An object of the invention is to provide a gas engine with means for gasifying the mixed fuel vapor and air, or transferring the same into a fixed gas, prior to the supplying of the gasified fuel to the engine cylinder.

Another object of the invention consists in utilizing the exhaust gases for heating a supply chamber into which a charge of fuel vapor and air has been drawn for the purpose of gasifying or transferring said fuel vapor and air into a fixed gas prior to the supplying of the same to the engine cylinder.

A further object of the invention is to provide a gas engine with a supply chamber into which the mixed fuel vapor and air is drawn, which supply chamber is substantially surrounded by a heating chamber which receives the exhaust gases so that substantially all of the heat units are removed from the exhaust gases and utilized as a working force for gasifying and expanding the mixed fuel vapor and air.

A still further object of the invention is to provide a cut-off for the supply chamber and mechanical means for drawing the fuel and air into the supply chamber, said mechanical means also operating to force the gasified fuel into the engine cylinder.

A still further object of the invention is to provide a gas engine of the above character wherein the intake ports have a combined area substantially equal to the cross sectional area of the cylinder, said intake ports being uncovered by the piston and utilizing mechanical means for forcing the gasified fuel into said cylinder, the maximum capacity of said mechanical means corresponding to the capacity of the cylinder, whereby the in-rushing gases may be used for completely scavenging the cylinder under full load.

A further object of the invention is to provide a gas engine which includes a pair of cylinders arranged side by side with their axes parallel, the combustion chambers of which cylinders are connected so that the pistons are simultaneously acted upon by the expanding gases, and wherein a gasified fuel is supplied to one of said cylinders while the burnt gases are exhausted from the other cylinder, the fuel-receiving cylinder being of smaller diameter than the other cylinder whereby the fuel gases under light loads will, with certainty, fill the fuel-receiving cylinder and surround the ignition devices adjacent the upper end thereof.

A still further object of the invention is to provide an engine of the above character wherein mechanical means is utilized for forcing the fuel gases into the fuel receiving cylinder so that said fuel gases will be caused to rush over the surfaces of the cylinder and over the ignition devices, thus preventing the accumulation of carbon.

A still further object of the invention is to provide a gas engine of the above character wherein the capacity of the mechanical means for forcing the fuel gases into the cylinders is substantially equal to the volume of both cylinders, and wherein the intake ports are uncovered by the piston, and the combined area of said intake ports is substantially equal to the cross sectional area of the small cylinder.

A still further object of the invention is to provide an engine of the above character wherein the cylinders are rotated during the operation of the machine, and wherein air is taken by suitable devices rotating with the cylinders and forced through the delivery end of the exhaust pipe in the direction of travel of the exhaust gases, said out-rushing air causing a vacuum in the exhaust pipe which facilitates the rapid scavenging of the cylinder.

A still further object of the invention is to provide an engine of the above character with oil supplying pipes for oiling the movable parts of the engine, which pipes extend through the crank shaft and the crank formed therein, and circulating the cool fuel vapors and air in and about the pipes for cooling the oil and also for cooling the inner parts of the bearings of the crank.

A still further object of the invention is to provide means for circulating air about the outer parts of the crank bearings for cooling the same.

A still further object of the invention is to provide a cut-off for controlling the supply to the mechanical means which draws the fuel vapor and air into the supply chamber, which cut-off may be shifted so as to reverse the engine.

These and other objects will in part be obvious and will in part be hereinafter more fully disclosed.

In the drawings, which show by way of illustration one embodiment of the invention:—

Fig. 2 is a horizontal sectional view through the same, the oil pipes being omitted;

Fig. 3 is an end view of the engine illustrating the application thereto of a guard and fan blades interposed between the guard and engine;

Fig. 4 is a plan view of the engine;

Fig. 5 is a detail view, partly in side elevation and partly in section, showing the pistons and the connection between the same and the crank;

Fig. 6 is a perspective view of the end caps which tie together the pistons so that the centrifugal force acting on one piston is counterbalanced by the other, also showing the filler ring between the pump pistons and the cylinder pistons;

Fig. 7 is a perspective view of one of the rings and cross bars to which the piston rod is connected;

Figure 1:
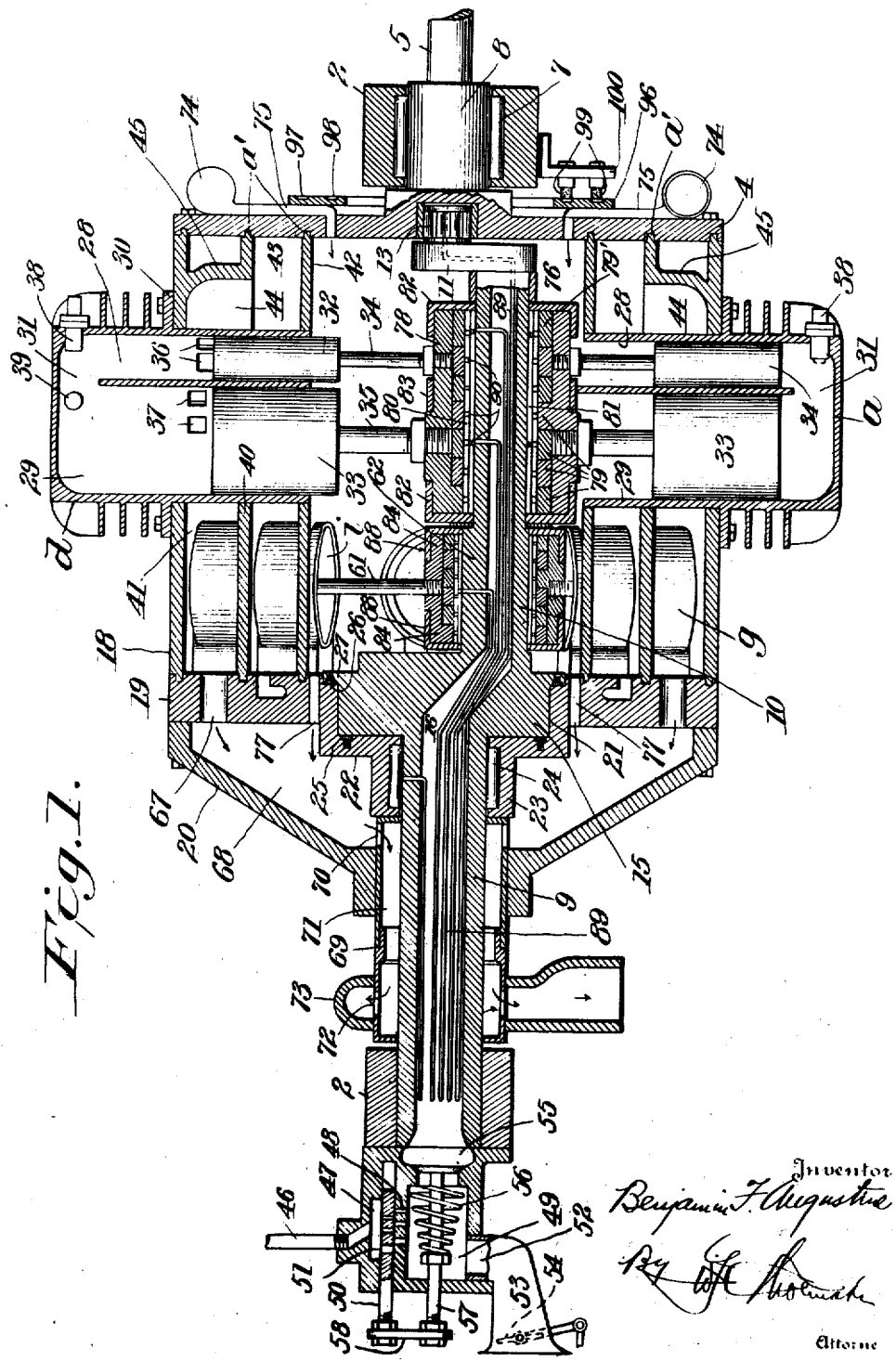
Figure 1 is a vertical sectional view through an engine having my improvements applied thereto.

Fig. 7ᵃ is a perspective view of the idle or thrust ring;

Fig. 8 is a perspective view of the inner floating sleeves located on the crank between the crank and the rings on the piston rods;

Fig. 9 is a view showing, more or less diagrammatically, partly in side elevation and partly in section, the cylinders, the pistons, therein, and the connection with the pistons and the crank;

Fig. 10 is a view, partly in section and partly in side elevation, showing the cylinders, the rotating supporting case, and the manner of connecting the intake ports with the supply chamber;

Fig. 11 is a sectional view on the line 11—11 of Fig. 10;

Fig. 12 is a view, partly in side elevation and partly in section, showing the transfer pumps for drawing in a charge and delivering the same to the supply chamber and also for forcing the charge of gasified fuel into the cylinders;

Fig. 13 is a perspective view of one end of the body portion of the casing, showing the pumps and cylinders and the ports leading thereto;

Fig. 14 is a perspective view of one of the end caps for the engine casing;

Fig. 15 is a perspective view of the ported ring which connects the intake ports for the pumps to the supply chamber and to the supply passage, and also which connects the exhaust ports of the engine with the chamber which receives the exhaust from the engine cylinders and which leads this exhaust to a common outlet;

Fig. 16 is a side view of the ported ring, showing the relative position of the shaft;

Fig. 17 is a plan view of the central shaft;

Fig. 18 is a sectional view on the line 18—18 of Fig. 17;

Fig. 19 is an end view of said shaft;

Fig. 20 is a sectional view on the line 20—20 of Fig. 17;

Fig. 21 is an enlarged detail sectional view illustrating the expansible connection of the fuel-receiving and exhaust chamber walls with one of the end caps and the ported ring;

Fig. 22 is a fragmentary sectional view taken longitudinally through the engine crank shaft illustrating the reversing device applied thereto;

Fig. 23 is a sectional view on the line 23—23 of Fig. 22;

Fig. 24 is an end view of the engine crank shaft illustrating the means to operate the reversing mechanism;

Fig. 25 is an enlarged fragmentary sectional view of the engine cylinder.

The invention in the present embodiment illustrated in the drawings consists generally in a rotating casing which is mounted to rotate relative to a fixed crank shaft. This rotating casing carries a series of pairs of cylinders. The cylinders of each pair are side by side and their axes are substantially parallel and radial relative to the center of the casing. One of these cylinders is larger in diameter than the other. The cylinder of smaller diameter is provided with intake ports uncovered by the piston, while the cylinder of larger diameter is provided with exhaust ports likewise uncovered by the piston of this cylinder. The combustion chambers of the two cylinders are connected so that the expanding gases act on both pistons simultaneously. The pistons are connected by suitable connecting rods to the crank which is the center about which the pistons rotate. As the crank is fixed, these pistons become really abutments, while the cylinders move on the pistons due to the fact that they turn with the casing which is mounted to rotate about a different center. It will be understood, of course, that, if the casing is fixed and the crank rotates, then the pistons will move in the cylinders. While I have shown an engine of the first type where the cylinders and casing rotate, it will be understood, of course, that from certain aspects of the invention the crank may rotate, and I will, therefore, describe the piston and cylinder as having a relative movement, intending this term to cover either type of invention referred to.

The engine is supplied with vaporized fuel and air through a cut-off which may be shifted to throttle the engine by varying the amount of fuel vapor and air delivered to the engine. This mixture of fuel vapor and air is drawn in by suitable pumps operated by the engine which transfers the charge drawn through the cut-off controlled ports to a supply chamber, and also forces the mixed gasified fuel from the supply chamber into the intake cylinder. The cylinders receive the charge one after the other in succession from the supply chamber. The intake ports are relatively large, while the cylinder which receives the charge is smaller in diameter than the cylinder which discharges the burnt gases. The exhaust gases are received in a chamber which extends substantially entirely about the supply chamber so that all of the heat units are taken out of the hot exhaust gases and utilized for gasifying or transferring the fuel vapor and air into a fixed gas. The intake pumps are so constructed and operated as to substantially continuously furnish the supply chamber with the mixed fuel vapor and air, and the capacity of these pumps is substantially equal to the volume of the two cylinders. The pistons of both the engine cylinders and the pump cylinders are connected to their cranks by piston rods which are provided with rings surrounding two floating sleeves on the crank, and each piston rod has laterally extending bars which bear against an idle ring engaging these sleeves, which ring is slightly larger than the rings connected to the piston rods, so that the working force against the crank does not in any way bind the rings on the piston rods of the cylinders which are inactive. Cap plates also engage these bars so that the centrifugal force on one piston is counterbalanced by the centrifugal force on an opposed piston.

Funnel-shaped devices are associated with the cylinders for taking in air which is caused to circulate about the outer parts of the bearings on the crank, and also to pass through the exhaust pipe and out through the delivery end thereof so that the outrushing air causes a vacuum in the exhaust pipe to facilitate the discharge of the burnt gases from the chamber receiving the same. Oil is supplied to the pistons and the bearings on the crank through pipes which extend lengthwise of the shaft, which is hollow for this purpose, and the cool fuel vapors and air drawn in by the pumps extend the entire length of the shaft and down into the crank for cooling the oil and also for cooling the inner parts of the bearings on the crank.

Referring more in detail to the drawings:—

The engine consists of a supporting base 1 which is provided with suitable standards 2—2. Between the standards 2—2 is a rotating supporting case 3 which is preferably cylindrical in cross section. This supporting case has a cap plate 4 fixed to one end thereof to which is rigidly attached a shaft 5, and on this shaft 5 are the driving pulleys 6 so that, as the supporting case 3 rotates, the shaft 5 will cause the pulleys 6 to rotate, and power is taken from these pulleys, or, if desired, by a direct drive from the shaft. Roller bearings 7 are mounted in the standard 2 at the right of the machine, as viewed in Fig. 1, and the shaft 5 is formed with an enlarged section 8 which bears on the rollers of said roller bearings.

Extending through the case, and also through the left hand bearing 2, as viewed in Fig. 1, is a fixed shaft 9. This shaft 9 is held from rotation by any suitable means and is formed with a crank 10. The shaft is shown in detail in Figs. 17 to 20, inclusive. The crank 10 is off-set from the center of the shaft. At the end of the crank 10 there is an arm 11 with a projecting portion 12 which is really the end of the shaft 9. This projecting portion 12 extends into a suitable recess in the cap plate 4, and there are roller bearings 13 between the extension 12 and the wear plate on the inner face of the recess in this cap plate. The arm 11 is removably attached to the crank 10, (see Fig. 20) and is held thereon by a suitable nut 14.

Mounted between the ends of the shaft 9 is an integral cylindrical section 15. The shaft 9, as shown in Figs. 1 and 20, is provided with a central recess 16. This central recess extends from the left hand end of the shaft through the crank to a point adjacent the arm 11 at the end of the crank. The cylindrical section 15 is provided with an intake port 17 which leads to the recess 16. The supporting case 3 has a central body portion 18, to one end of which the cap plate 4 is attached, and at the other end of this body portion there is a ported ring 19 and a cap plate 20.

The cap plate and ported ring are both bolted to the body portion 18 and turn therewith. The ported ring 19 has a central recess 21 into which extends the shaft section 15 which forms the other bearing for the supporting case. The bearing cap 22 is integral with the ring 19 and rotates therewith. Said cap has an extension 23 provided with a recess for rollers 24. These rollers bear against the outer hardened face of the shaft 9. There is a packing ring 25 between the side face of the bearing cap 22 and the side face of the cylindrical section 15. There is also a packing ring 26 between the edge of this bearing cap 22 and a flange 27 on the cylindrical section 15. This bearing cap 22 is formed with an opening which registers with the port 17.

The oil lubricating the rollers 24 works in and about the packing rings 25 and 26 by centrifugal forces and forms seals at these points. These seals it will be noted, are on opposite sides of the intake port 17, and also on opposite sides of the transfer port, which will be referred to hereinafter, and, therefore, the seals serve to prevent any possible leakage of fuel vapors either to the one side or the other of the rotating connection between the case and the fixed shaft.

In the present embodiment of my invention, the rotating case is provided with six pairs of cylinders, indicated at $a$, $b$, $c$, $d$, $e$, and $f$. Each of these pairs of cylinders consists of a relatively small cylinder 28 and a relatively large cylinder 29. Preferably the cross sectional area of the cylinder 29 is twice the cross sectional area of the cylinder 28. The cylinders are formed on their outer faces with projecting ribs or fins which serve to cool the cylinders in the well-known manner in this type of engine. The engine is an air cooled engine. The two cylinders 28 and 29 may be cast together or may be made separately so that air will pass between the cylinders. In Fig. 25 of the drawings, I have shown this modified form of cylinder construction with the air space between the cylinders. These cylinders may be secured to the rotating case by bolting the flange 30 thereto, said supporting case being recessed to receive the flange 30' depending from the flange 30. It will be understood that there are other ways which may be used for securing the cylinders to the supporting case.

As clearly shown in Fig. 1 of the drawings, the cylinders project beyond the supporting case and also project into the supporting case. The combustion chambers of these cylinders 28 and 29 are connected by a passage 31, and the walls at the outer end of the cylinders are rounded off so as to avoid as far as possible pockets into which the burnt gases may accumulate and to form smooth surfaces over which the fuel gases may rush to prevent the accumulation of carbon thereon.

The cylinder 28 is provided with a piston 32, while the cylinder 29 is provided with a piston 33. The piston 32 is connected by means of a piston rod 34 to the crank 10 by my new form of connection, which will be described hereinafter. The piston 33 is connected to the crank 10 by a piston rod 35 by this same specific connection. It will be understood that the piston rods of each pair of cylinders are connected to this same crank 10.

The gasified fuel is led to the cylinder 28 through intake ports 36 which are uncovered by the piston 32 when this cylinder has moved outward to its extreme opposite or, if the crank is a rotating crank, then when the piston has moved inward to its extreme position. The combined area of these intake ports is substantially the same as the cross sectional area of the cylinder 28. The burnt gas is exhausted from the two cylinders through exhaust ports 37, and the combined area of these exhaust ports is equal to, or slightly larger than, the cross sectional area of the cylinder 29. As shown in Fig. 1 of the drawings, I have provided each pair of cylinders with two spark plugs, one of which is indicated at 38, while the other is indicated at 39.

The body portion of the supporting case is provided with a cross partition 40 which forms a chamber 41 extending about the cylinders from end to end of the body portion of the case, and this chamber 41 is connected to the exhaust ports 37 so that the exhausted gases pass from all of the cylinders into this common receiving chamber 41. There is a second partition 42 across the body portion of the supporting case forming a chamber 43 which is the receiving chamber for the vaporized fuel and air. Leading from this chamber 43 is a passage 44 which extends up along the side of the cylinder and connects with the intake ports 36. This passage 44 is formed by a web or wall 45 (see Figs. 1 and 11). The cross partitions 40 and 42 and the annular body portion of the rotatable case have tongue and groove connection $a'$ with the end cap 4 and the ported ring 19, and as shown particularly in Fig. 21, the cross partitions 40 and 42 have their tongue and groove connections $a'$ made to allow for expansion under extreme heat to prevent danger of the extreme heat cracking the case.

From the above, it will be taken that the chamber 41 entirely surrounds the fuel-receiving chamber, thus making in a measure an oven of the fuel-receiving chamber so that the combined mixture of vaporized fuel and air drawn into the chamber 43 will be heated, expanded, and thoroughly gasified or transformed into a fixed gas. This heating of the mixture of vaporized fuel and air also takes substantially all of the heat units out of the expelled burnt gases and converts said heat units back into work in the placing of the mixed vaporized fuel and air under pressure and thoroughly gasifying the same. The exhaust gases delivered from the exhaust pipe hereinafter referred to are substantially cool, and this greatly increases the efficiency of the engine.

The vaporized fuel is supplied to the engine in the present embodiment of the engine through a pipe 46. This pipe 46 connects with a passage 47 at the end of the shaft 9, and the passage 47 is connected by the ports 48 with a central passage 49. A cut-off valve 50 having ports 51 therein coöperates with the ports 48 and controls the amount of fuel passing down through the ports 48 into the passage 49. Air is drawn into this passage 49 through an intake port 52 connected with a funnel 53 having a butterfly valve 54 suitably operated so as to regulate the amount of air supplied. The shaft 9 has a central recess 16, as above noted, and this recess is connected with the passage 49 through a port which is controlled by a valve 55. The valve 55 is held on its seat by a spring 56, and the stem 57 of the valve 55 is connected by a bar 58 to the cut-off valve 50.

As a mechanical means for drawing the fuel and air through the port carried by the valve 55 and delivering the same to the fuel-receiving chamber 43, I have provided a series of pumps. There are six pairs of cylinders, and in the present embodiment of the invention, there are six pumps, indicated at $g$, $h$, $i$, $j$, $k$ and $l$ (see Fig. 12). Each pump consists of a cylinder 59 in which is a piston 60. Each piston is connected by a piston rod 61 to the crank 10. The crank 10, however, is formed with an eccentric enlargement 62 at the point where these piston rods 61 are connected, and this eccentric enlargement is so disposed that the relative movement of the pumps in their respective cylinders is less than the relative movement of the pistons of the engine in their respective cylinders. These pumps are of relatively larger diameter so that the volume of each pump cylinder, notwithstanding the short relative stroke of the piston and cylinder, is substantially equal to the volume of each pair of cylinders of the engine. The specific connection between the piston rods 61 and the crank 10 is the same as the specific connection between the piston rods of the engine cylinders and the crank 10, and this specific structure will be hereinafter described in detail.

Each pump cylinder has a common intake and delivery port 63. The ported ring 19 has a port 64 which connects with each port 63 of the pumps. Each of the ports 64 extends radially of the ported ring 19 to the inner central recess, and also through the bearing cap 22 (see Fig. 2). The cylindrical section 15 has a recess 65 in a portion of its outer face. The ported ring 19 also has ports 66 which open against the outer face of this cylindrical section 15 the same as the ports 64. When the recess 65 is opposite the ports 64 and 66, then the ports 64 and 66 will be connected. The port 66 opens into the chamber 43 so that the fuel gases drawn into the pumps will be expelled through the port 64 into the recess 65 and then through the port 66 and into the fuel-receiving chamber 43. This ported ring 19 rotates through the supporting case, and the cylindrical section 15 is fixed so that the port 64 will at times register with the recess 65 and will at times register with the intake port 17 which leads to the central recess 16 in the shaft 9. It will be noted in Fig. 18 of the drawings that the recess 65 and also the intake port 17 are of sufficient circumferential length so that the intake ports of three pumps will be simultaneously connected with the recess in the center of the shaft so as to receive the mixed vaporized fuel and air. These ports are so positioned relative to the setting of the centers of the supporting case and the crank that the intake ports of the pumps are connected to the supply when the pistons and pump cylinders are moving relatively so as to draw in a charge. The other three pumps will be connected to the recess 65 and will be discharging the mixture drawn in through the air intake and outlet ports 64 and 66 into the fuel-receiving chamber 43.

The pumps which are discharging the contents drawn in thereby to the fuel-supply chamber are forcing the fuel of said fuel-supply chamber into one of the cylinders. The intake ports are so positioned as to be uncovered for a period of time slightly less than one-sixth of a revolution of the engine case so that one cylinder at a time is open to the fuel-supply chamber. At this time, three pumps are forcing the fuel forward into the cylinder. During this sixth of a revolution, each one of these three pumps will discharge substantially a third of its maximum capacity into the cylinder before the intake ports are closed by the piston, and this equals the volume of one pump, which equals in turn the volume of the two cylinders supplied with the gasified fuel at this time. Under maximum load, therefore, when the pumps receive their full capacity, a supply of gasified fuel equal to the volume of the pair of cylinders will be forced into the cylinders by these pumps, while the intake ports are open, and this will result in a one-hundred per cent. scavenging of the cylinder. The exhaust ports are timed to open slightly in advance of the intake ports, which prevents any possible chance of the burnt gases being forced by back-pressure into the fuel supply. As soon as the intake ports are open, the gas rushes in, partly through the pressure back of the gas of the pumps, and partly through the gasifying of the fuel vapors and air, and placing the same under pressure through the heat units derived from the exhaust gases, and this in-rushing fuel gas forces all of the burnt gases over into the larger cylinder and out of the same through the exhaust ports. The fuel gases rushing in over the curved surfaces in the cylinder walls prevent any accumulation of carbon thereon, and also prevents the accumulation of carbon on the spark plugs.

When the engine is throttled down, then the pumps do not receive their full maximum capacity of vaporized fuel and air, and as a consequence supply a less amount of mixture to the fuel-supply chamber and force a less amount of gasified fuel or fixed gases into the cylinders. Even, however, with the lowest throttling of the engine, there is sufficient fresh gas taken in to completely fill the small cylinder and the region around the spark plugs, assuring that under these conditions there will be fresh fuel gases to ignite at the spark plugs. These fuel gases rushing from the smaller cylinder into the larger cylinder expand as they reach the larger cylinder, and thus a portion of their on-rushing force is suspended, which prevents the fuel gases from penetrating through the waste burnt gases, but, on the contrary, said fuel gases spread out as a blanket, forcing the burnt gases in front of the same and out through the exhaust ports. In the preferred form of the invention, the cylinders are rotating, the fuel gases are heavier than the burnt gases, and centrifugal force will aid in the carrying of the fuel gases through the small cylinder and around the spark plugs and in separating the burnt gases from these heavy fuel gases.

The exhaust gases above noted are received by the chamber 41. The ported ring 19 is provided with a series of ports 67 which extend directly through this ported ring and lead into the chamber 68 formed between the ported ring 19 and the end cap 20 of the engine. Surrounding the shaft 9 is a sleeve 69. This sleeve 69 is provided with a series of openings 70 which connect with the chamber 68 with the passage 71 between this sleeve 69 and the shaft 9. The sleeve 69 is also provided with a series of passages 72 which connect with a discharge pipe 73 attached to the sleeve.

Attached to the supporting case and rotating therewith is a series of funnels 74 which are directed so as to take air as the engine cylinder rotates. These funnels are connected by tubes 75 with the inner chamber 76 of the supporting case. Air rushing in through these funnels will be directed about the outer faces of the bearings on the crank and will pass out through the openings 77 into the chamber 68 and out through the chamber 68 and finally to the discharge pipe 73. This out-rushing air creates more or less of a vacuum in the chamber 41 which receives the exhaust gases, and this greatly facilitates the scavenging of the cylinders.

The piston rods 34 and 35 are connected to a common cross bar 78. This cross bar 78 carries a ring 79. On the crank 10 are two floating sleeves 80 and 81. The ring 79 surrounds these two sleeves. It will be understood that these rings 79 are staggered on their respective cross bars so that the rings are disposed side by side. There is one ring for each cross bar and, therefore, there are six rings when there are six pairs of cylinders. In Fig. 1 of the drawings, I have shown seven rings on the floating sleeves. One of these rings, for instance, ring 79' however, is idle and takes the thrust of the cross bar as it is slightly larger in diameter, and this relieves the other rings from the thrust so that they will turn freely on the sleeves at this time. During the thrust of the ring against the floating sleeves, either the outer or the inner sleeve will move with the angularly turning piston rod thrusting against the sleeve, and this movement of one sleeve on the other and the sleeves on the crank greatly distributes the wear. Furthermore, after the parts have become worn, one of the sleeves may be removed and a new sleeve inserted in the place thereof which is turned to a size so as to take up the wear, thus the wear on all of the rings will be simultaneously taken up.

At each end of the cross bars 78 there are cap rings 82. These cap rings encircle the ends of the cross bars. Also between the piston rods 33 and 34 there is a ring 83. These cap rings and the central ring 83 causes the centrifugal force acting on opposed pistons to be counterbalanced, that is, the centrifugal force tending to throw the piston outward on one side of the engine brings the cross bar against the cap rings, and the centrifugal force on the opposite side of the engine tending to force out the opposed cross bar, braces the cross bar against these cap rings, and thereby this counterbalance is effected. The piston rods 61 are also each provided with cross bars 84, each of which has a ring 85 surrounding floating sleeves 86 and 87. Cap plates 88 engage the outer faces of these cross bars. The rings and cap plates are placed on the crank 10 by removing the arm 11.

From the above construction, it will be apparent that I have provided a connection between the crank and the piston rods wherein the wear is reduced to a minimum and is centered on floating sleeves which may be readily removed, and wherein the centrifugal force acting on the several pistons is perfectly counterbalanced.

Oil is supplied to the bearings adjacent the crank through oil pipes 89. These oil pipes are located in the recess 16 in the shaft 9 and extend out through the crank. One of said pipes leads to the outer surface of the crank beneath the floating sleeves 86 and 87, while two other pipes lead to the outer face of the crank beneath the sleeves 80 and 81. The sleeves are provided with suitable perforations 90 which allow the oil to work out through centrifugal force to lubricate the parts between the sleeves and also lubricate the outer face of the outer sleeve. The cross bars are provided with suitable radial openings 91 and sockets 92' which serve to effect the connection of the respective piston rod with the respective cross bar and also to carry the oil out through the opening 93 in the respective piston rod and through suitable openings 94 in the cross pins to which the respective piston rods are connected, and finally to a circumferential groove 95 in the side wall of the pistons. Thus the lubricating oil is carried by centrifugal force not only to the openings for the piston rods on the crank but out through the piston rods to the sliding surface between the piston and the cylinder. The pistons for the pumps are oiled in the same manner. There is also an oil pipe 89 which furnishes oil to the roller bearings 13 at the end of the shaft 9, and another pipe which furnishes oil to the roller bearing 24. These oil pipes extending through the recess 16 are surrounded by the cool fuel vapors that are drawn into the engine by the pumps, and this serves not only to cool the oil passing through the pipes, but it also cools the inner parts of the bearings.

Mounted on the end cap 4 is a ring 96 of suitable insulating material which is provided with spaced pins 97 and 98. These pins are arranged in pairs and are connected in any suitable way with the respective spark plugs in the pair of cylinders with which said pair of pins is associated. Suitable brushes 99 carried by a fixed plate 100 contact with these pairs of pins, and this furnishes the spark with ignition to fire the cylinders preferably successively. By shifting this plate 100 the spark may be retarded or advanced, if desired.

From the above description, it will be apparent that I have provided a gas engine wherein vaporized fuel and air are drawn by mechanical means into a fuel-supply chamber, and this fuel-supply chamber is located within the chamber receiving the exhaust gases and, therefore, becomes in a measure an oven for heating the mixed vaporized fuel and air, thus thoroughly gasifying the same or transferring said mixture into a fixed gas. The vaporized fuel and air is drawn in cold and not under pressure. It is heated, gasified and expanded and put under pressure in this supply chamber. Substantially all of the heat units are taken out of the exhaust gases and it is transferred back into work in the expanding and gasifying of this mixture of vaporized fuel and air. On the opening of the intake ports of any cylinder, a charge of gasified fuel is mechanically transferred into the cylinder with little or no friction because the intake ports are of substantially the same area as the cross sectional area of the intake cylinder. The intake gases are received by the cylinder of smaller diameter than its companion cylinder, and rushing therethrough insure the complete scavenging of this smaller cylinder and all the parts in the region of the spark plugs which are located adjacent the upper end of this smaller cylinder. Even when the engine is throttled down to its lowest limit, this cylinder of small diameter will be supplied with fresh gasified fuel. The fuel gases also rushing over the walls of the cylinder through the expanding force and the pressure exerted by the mechanical means referred to will insure that all the walls be kept free from the accumulation of carbon and will particularly flush the spark plugs and remove any carbon which may tend to accumulate thereon.

It will be noted that, with my improved means for heating a fuel-supply chamber into which the vaporized fuel and air is drawn just prior to the supplying of the same to the cylinder, all fuel vapor, water vapor, oil vapor and any other liquids contained in the mixture is thoroughly gasified or transformed into a fixed gas which is substantially dry, and, therefore, as this heated gasified fuel is at once taken into the cylinders I am able to get a very much more perfect combustion with little or no deposite of carbon.

It will be noted that the pump cylinders extend across the chamber receiving the heated exhaust gases, also the ported ring having the ports which conduct the vaporized fuel and air to the pump and likewise conduct the vaporized fuel and air from the pumps to the fuel-supply chamber is also heated on both sides by the exhaust gases, and, therefore, as the vaporized fuel and air enter this ported ring it strikes against rounded and also angular surfaces which spreads out the fuel and air and as the fuel vapors also strike against the curved walls of the pump chambers it is again spread out and deflected, likewise as it leaves the pumps and case against the curved walls in the ports in the ported chamber it is again spread out and deflected, and thus I have provided a series of baffles, all of which are heated by the exhaust gases against which the vaporized fuel and air is projected as it is drawn in by the pumps, and this serves as an extremely efficient means for heating, expanding and gasifying the vaporized fuel and air and likewise an efficient means for taking all of the heat units out of the exhausted gases.

The fuel gases, after passing into the cylinder of larger diameter, expand, and a portion of their on-rushing force is expended which insures that the fuel gases will spread out and force all the burnt gases in front of the same up through the exhaust ports which are open wide and of an area substantially equal to the cross sectional area of the larger cylinder. When the engine is throttled down so that some of the burnt gases remain in the cylinder, they will remain in this larger cylinder and serve in a measure as a filler between the fresh drawn in gasified fuel and the piston coöperating with the larger cylinder. The burnt gases rush out through the exhaust ports into the exhaust receiving chamber and serve, as above noted, to heat the supply chamber and practically all of the heat units are taken out of said gases and the gases are expanded to their full limit so that when released through the final discharge exhaust pipe they are practically cool and are silently released. The engine, therefore, runs with little or no noise. Through this complete expansion of the gases and the taking out of all the heat units of the burnt gases, I am able to greatly increase the efficiency of the engine over those which have heretofore been devised.

The operation of the pumps for drawing in the fuel vapor and air has been fully described in connection with the construction of these parts. A series of pumps are simultaneously operated to deliver the mixed fuel gases and air, while another series are taking in fuel and air. The pumps which are delivering fuel and air are of such capacity as to supply a complete charge to both cylinders, when desired, equal in volume to the volume of the cylinders, thus resulting in a one-hundred per cent. scavenging of the cylinders.

The vaporized fuel and air drawn in by the pumps is circulated in and about the crank and serves to cool the bearings working thereon. The oil pipes passing through the recess in the center of the crank shaft supplying oil to the various parts are also cooled by this cool vaporized fuel and air.

Under certain conditions I may provide the rotatable case with a guard 101, as shown in Fig. 3, and between the guard and case I may dispose fan blades 102 to effect the circulation of a current of air through the spaces between the case, the guard and the projecting ends of the engine cylinders.

The engine may be constructed whereby it may be readily reversed. To this end, I slightly modify the enlargement 15 of the crank shaft 9, as shown in Figs. 22 and 23, and on the shaft 9 I mount a sleeve 103. This sleeve has annular tongues 104 and 105 which fit rotatably in the annular grooves 106 and 107, respectively, of the modified form of enlarged section 15 of the crank shaft 9. In this modified form of enlargement, two inlet supply ports are indicated at 17', 17' in Fig. 23. By rotating the sleeve 103 a one-half revolution on the shaft 9, I substitute the ports 17ª, 17ª for the inlet supply ports 17', 17', whereby, upon a one-half revolution of the sleeve 103 the inlet supply is changed from one side of the engine to the opposite side thereof and the engine thereby reversed. Any suitable tool may be employed to effect rotation of the sleeve 103. As shown, a device 108 may be employed, the same having claws 109 adapted to fit in sockets 110 of the sleeve, as shown in Figs. 22 to 24, inclusive.

When this reversing mechanism is employed the sleeve is interposed between the shaft 9 and the elements which surround the shaft 9 in Fig. 1 between the enlargement 15 and the carbureter, the standard 2 adjacent the carbureter being spaced slightly therefrom, as will be seen in Fig. 22 so as to provide a space for the application of the tool 108 to rotate the sleeve 103.

While I have described the invention as embodied in a multiple cylinder rotary gas engine, it will be obvious that the supporting case may be fixed and the crank rotate. In this form of the engine, the operation of drawing the fuel gases and supplying the same to the cylinders, and the operation of the cylinders is precisely the same, and, therefore, it is to be understood that the appended claims are not limited to the particular embodiment of the invention set forth herein, but may likewise be embodied in other forms and types of gas engines.

Having thus described my invention, what I claim as new and desire to secure by Letters-Patent is:—

1. In a gas engine, the combination of a pair of cylinders arranged side by side and in open communication, one of said cylinders having intake ports controlled by its piston and the other of said cylinders having exhaust ports controlled by its piston, a fuel supply chamber connected to said intake ports, a pumping mechanism for maintaining a charge of vaporized fuel and air in the supply chamber, and means for heating the supply chamber for gasifying the vaporized fuel in the supply chamber that the inrushing mixture will scavenge the cylinder when the piston of the intake cylinder uncovers the intake ports and establishes communication with the heated supply chamber.

2. In a rotary gas engine, the combination of a crank shaft, a pair of cylinders in open communication with each other and mounted to revolve about said crank shaft with their axes in planes substantially perpendicular to the axis thereof, pistons operating in said cylinders and connected to the crank shaft, a supply chamber connected to the inlet ports of one of said cylinders, means independent of the pistons for producing a flow of fuel and air to said supply chamber, means for heating the fuel and air in the supply chamber, and means for ignition.

3. In a rotary gas engine, the combination of a crank shaft, a pair of cylinders in open communication with each other and mounted to revolve about said crank shaft with their axes in planes substantially perpendicular to the axis of the shaft, one of said cylinders having intake ports and the other cylinder having exhaust ports, a piston in each cylinder controlling the ports thereof, a fuel supply chamber connected to the said intake ports, means for maintaining the supply chamber charged with a supply of vaporized fuel and air, and means for heating the supply chamber from the exhaust gases.

4. A gas engine including in combination, a cylinder, a piston therein, a fuel-supply chamber adjacent the cylinder, said cylinder having intake ports uncovered by the piston, said intake ports having a combined area substantially equal to the cross sectional area of the cylinder, means for supplying said chamber continuously with a mixture of vaporized fuel and air, and means for heating said supply chamber to gasify the vaporized fuel and air prior to the supplying of the same to the cylinder.

5. In a rotary gas engine, the combination of a plurality of cylinders and pistons, a rotary fuel supply chamber connected to the cylinders, means for maintaining the supply chamber constantly charged with fuel and air, and means for heating the fuel and air in the rotary supply chamber.

6. In a rotary gas engine, the combination of a plurality of cylinders and pistons, a rotary fuel supply chamber connected to the cylinders, means for maintaining the supply chamber constantly charged with fuel and air and means for conducting the exhaust gases from the cylinders about the fuel supply chamber for heating the same.

7. A gas engine including in combination, a cylinder, a piston therein, a fuel-supply chamber adjacent the cylinder, said cylinder having intake ports uncovered by the piston, the combined area of said intake ports being substantially equal to the cross sectional area of the cylinder, mechanical means for continuously supplying said chamber with vaporized fuel and air, and means for utilizing the exhaust gases for heating said fuel-supply chamber substantially throughout its entire length.

8. A gas engine including in combination, a pair of cylinders arranged side by side and having their axes substantially parallel, a piston for each cylinder, means for connecting the combustion chamber to the cylinder whereby said pistons are simultaneously acted upon by the expanding gases, one of said cylinders having intake ports uncovered by its piston, the other cylinder having exhaust ports uncovered by its piston, a fuel-supply chamber connected to the intake ports, a chamber adjacent the fuel-supply chamber and extending from end to end thereof for receiving the gases from the exhaust ports, whereby the exhaust gases may be used for heating said chamber to gasify the vaporized fuel and air therein.

9. A gas engine including in combination, a pair of cylinders arranged side by side and having their axes substantially parallel, a piston for each cylinder, means for connecting the combustion chamber to the cylinder whereby said pistons are simultaneously acted upon by the expanding gases, one of said cylinders having intake ports uncovered by its piston, the other cylinder having exhaust ports uncovered by its piston, a fuel-supply chamber connected to the intake ports, a chamber adjacent the fuel-supply chamber and extending from end to end thereof for receiving the gases from the exhaust ports, whereby the exhaust gases may be used for heating said chamber to gasify the vaporized fuel and air therein, and means for continuously supplying said fuel-supply chamber with vaporized fuel and air.

10. A gas engine including in combination, a pair of cylinders arranged side by side and having their axes substantially parallel, a piston for each cylinder, means for connecting the combustion chamber to the cylinder whereby said pistons are simultaneously acted upon by the expanding gases, one of said cylinders having intake ports uncovered by its piston, said intake ports having a combined area substantially equal to the cross sectional area of said cylinder, the other cylinder having exhaust ports uncovered by its piston, the combined area of said exhaust ports being substantially the same as the cross sectional area of the cylinder containing the exhaust ports, a fuel-supply chamber connected to the intake ports, a chamber for receiving the exhaust gases, said exhaust chamber substantially surrounding the supply chamber from end to end thereof whereby the heat of the exhaust gases may be utilized for gasifying the vaporized fuel and air mixed in the fuel chamber.

11. A gas engine including in combination, a pair of cylinders arranged side by side and having their axes substantially parallel, a piston for each cylinder, means for connecting the combustion chamber to the cylinder whereby said pistons are simultaneously acted upon by the expanding gases, one of said cylinders having intake ports uncovered by its piston, said intake ports having a combined area substantially equal to the cross sectional area of the cylinder containing the intake ports, the other cylinder having exhaust ports uncovered by its piston, the combined area of said exhaust ports being substantially the same as the cross sectional area of the cylinder containing the exhaust ports, a fuel-supply chamber connected to the intake ports, a chamber for receiving the exhaust gases, said exhaust chamber substantially surrounding the supply chamber from end to end thereof, whereby the heat of the exhaust gases may be utilized for gasifying the vaporized fuel and air mixed in the fuel chamber, and mechanical means for supplying said fuel-supply chamber with vaporized fuel and air.

12. A gas engine including in combination, a pair of cylinders arranged side by side and having their longitudinal axes substantially parallel, a piston for each cylinder, one of said cylinders having intake ports uncovered by its piston and being of considerable less cross sectional area than its companion cylinder which is provided with exhaust ports adapted to be uncovered by the piston of said cylinder, a fuel-supply chamber adjacent said cylinders and connected to said intake ports, and means for heating said fuel-supply chamber for gasifying the vaporized fuel and air contained therein and for placing said gases under pressure, whereby when said intake ports are opened the inrushing gases will completely scavenge and fill said intake cylinder.

13. A gas engine including in combination, a pair of cylinders arranged side by side, a piston for each cylinder, means for connecting the combustion chambers of said cylinders, one of said cylinders having intake ports uncovered by its piston and the other of said cylinders having exhaust ports uncovered by its piston, said intake cylinder being of considerably less cross sectional area than its companion cylinder, a fuel supply chamber connected substantially at one end thereof to said intake ports, a pumping mechanism connected substantially at the other end of said supply chamber for supplying a continuous flow of vaporized fuel and air to said fuel supply chamber, and means for heating said supply chamber for gasifying the vaporized fuel and air and for placing said gas in the fuel supply chamber under pressure whereby when said intake ports are uncovered by the piston, the inrushing gases will completely scavenge and fill the intake cylinder.

14. A gas engine including in combination, a pair of cylinders arranged side by side, a piston for each cylinder, means for connecting the combustion chambers of said cylinders, one of said cylinders having intake ports uncovered by its piston and the other having exhaust ports uncovered by its piston, said intake cylinder being of considerably less cross sectional area than its companion cylinder, a fuel supply chamber connected substantially at one end thereof to said intake ports, a pumping mechanism connected substantially at the other end of said supply chamber for supplying a continuous flow of vaporized fuel and air to said fuel supply chamber, and means for utilizing the exhaust gases for heating the supply chamber from end to end thereof whereby the vaporized fuel and air delivered cold by said pump to said fuel supply chamber will be heated, gasified, and placed under pressure so that when the intake ports are opened the dry gas rushing into said intake cylinder will completely scavenge and fill the same.

15. A gas engine including in combination, a pair of cylinders arranged side by side and having their longitudinal axes substantially parallel, a piston for each cylinder, one of said cylinders having intake ports uncovered by its piston and being of considerable less cross sectional area than its companion cylinder which is provided with exhaust ports adapted to be uncovered by the piston of said cylinder, a fuel-supply chamber adjacent the cylinders and connected with said intake ports, a chamber surrounding said fuel-supply chamber substantially from end to end thereof and connected to the exhaust ports whereby the exhaust gases may be utilized for heating the supply chamber.

16. A gas engine including in combination, a pair of cylinders arranged side by side and having their longitudinal axes substantially parallel, a piston for each cylinder, one of said cylinders having intake ports uncovered by its piston and being of considerable less cross sectional area than its companion cylinder which is provided with exhaust ports adapted to be uncovered by the piston of said cylinder, a fuel-supply chamber adjacent the cylinders and connected with said intake ports, a chamber surrounding said fuel-supply chamber substantially from end to end thereof and connected to the exhaust ports whereby the exhaust gases may be utilized for heating the supply chamber, and means for continuously supplying said fuel-supply chamber with vaporized fuel and air.

17. A gas engine including in combination, a plurality of cylinders each having an intake port, a piston in each cylinder, a fuel supply chamber connected to all of said intake ports, means for supplying said fuel supply chamber with a continuous flow of vaporized fuel and air, and means for heating said fuel supply chamber substantially throughout its entire length for gasifying the fuel and air therein.

18. A gas engine including in combination, a plurality of cylinders each having an intake port, a piston in each cylinder, a fuel supply chamber connected to all of said intake ports, means for supplying said fuel supply chamber with a continuous flow of cold vaporized fuel and air, and means for utilizing the exhaust gases from the cylinders for heating the supply chamber substantially throughout its entire length for gasifying the fuel and air therein.

19. A gas engine including in combination, a plurality of cylinders each having an intake port, a piston in each cylinder, a fuel supply chamber connected substantially at one end thereof to all of said intake ports, means for supplying the fuel supply chamber substantially at the other end thereof with a continuous flow of cold vaporized fuel and air, and means for utilizing the exhaust gases from the cylinders for heating the supply chamber substantially throughout its entire length for gasifying the fuel and air therein and placing the same under pressure, whereby when said intake ports are opened dry fuel gases will rush into the cylinders.

20. A gas engine including in combination, a cylinder, a piston therein, a rotating supply chamber connected to said cylinder for supplying the same with gasified fuel, means for supplying said chamber with vaporized fuel and air, and means for heating the outer wall of said fuel supply chamber, whereby the vaporized fuel and air thrown against the same by centrifugal force will be thoroughly gasified before entering the cylinder.

21. A gas engine including in combination, a cylinder, a piston therein, a rotating supply chamber connected to said cylinder for supplying the same with gasified fuel, a heating chamber surrounding the fuel supply chamber from end to end thereof for heating the outer wall of said fuel supply chamber whereby the vaporized fuel and air received into said fuel supply chamber and thrown against the outer wall thereof by centrifugal force will be thoroughly gasified before entering the cylinder.

22. A gas engine including in combination, a cylinder, a piston therein, a rotating supply chamber connected to said cylinder for supplying the same with gasified fuel, a rotating exhaust chamber surrounding the fuel supply chamber from end to end thereof and connected to the cylinder for receiving the exhaust gases, and means for supplying said fuel supply chamber with vaporized fuel and air.

23. A gas engine including in combination, a rotating supporting case, a plurality of pairs of cylinders carried thereby, the cylinders of each pair being arranged side by side with their longitudinal axes parallel, one of said cylinders having intake ports and the other cylinder having exhaust ports, means for connecting the combustion chambers of said cylinders of each pair, pistons in each cylinder, a fuel-supply chamber connected to said intake ports, means for supplying said fuel-supply chamber with vaporized fuel and with air, and means for heating said fuel-supply chamber for gasifying the fuel gases therein and placing the same under pressure whereby when said intake ports are opened the dry fuel gases will rush into the cylinder.

24. A gas engine including in combination, a rotating supporting case, a plurality of pairs of cylinders carried thereby, the cylinders of each pair being arranged side by side with their longitudinal axes parallel, one of said cylinders having intake ports and the other cylinder having exhaust ports, means for connecting the combustion chambers of said cylinders of each pair, pistons in each cylinder, a fuel-supply chamber connected to said intake ports, means for supplying said fuel-supply chamber with vaporized fuel and with air, and means for utilizing the exhaust gases for heating the supply chamber for gasifying the vaporized fuel and air for gasifying the fuel therein and placing the same under pressure whereby when the intake ports are opened the dry fuel gases will rush into said cylinder.

25. A gas engine including in combination, a rotating casing, a plurality of cylinders carried thereby, said supporting casing having a fuel supply chamber adjacent the cylinders and connected to each cylinder, a chamber surrounding the fuel supply chamber and receiving the exhaust gases from the cylinders whereby the vaporized fuel and air received into said supply chamber is gasified and placed under pressure before being admitted to the cylinder.

26. A gas engine including in combination, a rotating supporting casing, a plurality of cylinders carried thereby, said rotating casing having a fuel supply chamber adjacent said cylinders and connected to each cylinder, a chamber surrounding said fuel supply chamber and connected to the cylinders for receiving exhaust gases from all of the cylinders, said means for connecting the supply chamber to the cylinders being disposed adjacent one end of the supply chamber, and means for supplying vaporized fuel and air to the other end of said supply chamber.

27. A gas engine including in combination, a rotating supporting casing, a plurality of cylinders carried thereby, said rotating casing having a fuel supply chamber adjacent said cylinders and connected to each cylinder, a chamber surrounding said fuel supply chamber and connected to the cylinders for receiving exhaust gases from all of the cylinders, said means for connecting the supply chamber to the cylinders being disposed adjacent one end of the supply chamber, and means for supplying the other end of said fuel supply chamber with a continuous flow of substantially cold vaporized fuel and air.

28. A gas engine including in combination, a rotating supporting casing, a plurality of cylinders carried thereby, a fuel supply chamber within the casing and connected to the cylinders, and a plurality of pumps for furnishing vaporized fuel and air to the supply chamber, said pumps being constructed and operated so as to supply a continuous flow of vaporized fuel and air, and means for heating the fuel supply chamber for gasifying said fuel and air and placing the same under pressure prior to the admitting of the same to the cylinders.

29. A gas engine including in combination, a rotating supporting casing, a plurality of cylinders carried thereby, a fuel supply chamber connected to the cylinders, and a plurality of pumps independent of the engine cylinders and supported by and rotating with said casing for furnishing vaporized fuel and air to the supply chamber, said pumps being constructed and operated so as to supply a continuous flow of vaporized fuel and air, and means for heating the fuel supply chamber for gasifying said fuel and air and placing the same under pressure prior to the admitting of the same to the cylinders.

30. A gas engine including in combination, a rotating supporting casing, a plurality of radially disposed cylinders carried thereby, said rotating supporting casing having an annular chamber formed therein connected to each of the cylinders for supplying fuel gases thereto, and an annular chamber outside of and surrounding said first-named chamber for receiving the exhaust gases from the cylinder.

31. A gas engine including in combination, a rotating supporting case, a plurality of pairs of cylinders carried thereby, the cylinders of each pair being arranged side by side with their longitudinal axes parallel, one of said cylinders having intake ports and the other cylinder having exhaust ports, means for connecting the combustion chambers of said cylinders of each pair, pistons in each cylinder, a fuel-supply chamber adjacent said cylinders and connected to each of the intake ports, a chamber surrounding said fuel supply chamber and receiving the exhaust gases from all of the cylinders, whereby the vaporized fuel and air in the supply chamber is gasified.

32. A gas engine including in combination, a rotating supporting case, a plurality of pairs of cylinders carried thereby, the cylinders of each pair being arranged side by side with their longitudinal axes parallel, one of said cylinders having intake ports and the other cylinder having exhaust ports, means for connecting the combustion chambers of said cylinders of each pair, pistons in each cylinder, a fuel-supply chamber adjacent said cylinders and connected to each of the intake ports, a chamber surrounding said fuel-supply chamber and receiving the exhaust gases from all of the cylinders, whereby the vaporized fuel and air in the supply chamber is gasified, mechanical means for supplying said fuel-supply chamber with vaporized fuel and with air.

33. A gas engine including in combination, a rotating supporting case, a plurality of pairs of cylinders carried thereby, the cylinders of each pair being arranged side by side with their longitudinal axes parallel, one of said cylinders having intake ports and the other cylinder having exhaust ports, means for connecting the combustion chambers of said cylinders of each pair, piston in each cylinder, a fuel-supply chamber adjacent said cylinders and connected to each of the intake ports, a chamber surrounding said fuel supply chamber and receiving the exhaust gases from all of the cylinders, whereby the vaporized fuel and air in the supply chamber is gasified, a series of pumps operating to supply a continuous flow of vaporized fuel and air to said supply chamber.

34. A gas engine including in combination, a rotating supporting case, a plurality of pairs of cylinders arranged side by side and disposed radially and at equal angular intervals about the center of said case, one of said cylinders being smaller than the other, means for connecting the outer ends of the cylinders, a piston for each cylinder, exhaust ports in the larger cylinder adapted to be uncovered by its piston, intake ports in the smaller cylinder adapted to be uncovered by its piston, said intake ports in the successive cylinders being opened and closed in succession, a common fuel-supply chamber for all of said intake ports, and means for heating said supply chamber.

35. A gas engine including in combination, a rotating supporting case, a plurality of pairs of cylinders arranged side by side and disposed radially and at equal angular intervals about the center of said case, one of said cylinders being smaller than the other, means for connecting the outer ends of the cylinders, a piston for each cylinder, exhaust ports in the larger cylinder adapted to be uncovered by its piston, intake ports in the smaller cylinder adapted to be uncovered by its piston, said intake ports in the successive cylinders being opened and closed in succession, a common fuel-supply chamber for all of said intake ports, means for heating said supply chamber, and means for supplying a continuous flow of vaporized fuel and air to the supply chamber.

36. A gas engine including in combination, a rotating supporting case, a plurality of pairs of cylinders arranged side by side and disposed radially and at equal angular intervals about the center of said case, one of said cylinders being smaller than the other, means for connecting the outer ends of the cylinders, a piston for each cylinder, exhaust ports in the larger cylinder adapted to be uncovered by its piston, intake ports in the smaller cylinder adapted to be uncovered by its piston, said intake ports in the successive cylinders being opened and closed in succession, a common fuel-supply chamber for all of said intake ports, means for heating said supply chamber, and pumping means operating to continuously supply said fuel-supply chamber with vaporized fuel and air.

37. A gas engine including in combination, a rotating supporting case, a plurality of pairs of cylinders arranged side by side and disposed radially and at equal angular intervals about the center of said case, one of said cylinders being smaller than the other, means for connecting the outer ends of the cylinders, a piston for each cylinder, exhaust ports in the larger cylinder adapted to be uncovered by its piston, intake ports in the smaller cylinder adapted to be uncovered by its piston, said intake ports in the successive cylinders being opened and closed in succession, a fuel-supply chamber in said case connected to each of said intake ports, a chamber surrounding said fuel-supply chamber and adapted to receive the exhaust gases from all of the cylinders whereby the exhaust gases may be utilized to heat the supply chamber.

38. A gas engine including in combination, a rotating supporting case, a plurality of pairs of cylinders arranged side by side and disposed radially and at equal angular intervals about the center of said case, one of said cylinders being smaller than the other, means for connecting the outer ends of the cylinders, a piston for each cylinder, exhaust ports in the larger cylinder adapted to be uncovered by its piston, intake ports in the smaller cylinder adapted to be uncovered by its piston, said intake ports in the successive cylinders being opened and closed in succession, a fuel-supply chamber in said case connected to each of said intake ports, a chamber surrounding said fuel-supply chamber and adapted to receive the exhaust gases from all of the cylinders whereby the exhaust gases may be utilized to heat the supply chamber, and means for supplying said supply chamber with a continuous flow of vaporized fuel and air.

39. A gas engine including in combination, a rotating supporting case, a plurality of pairs of cylinders arranged side by side and disposed radially and at equal angular intervals about the center of said case, one of said cylinders being smaller than the other, means for connecting the outer ends of the cylinders, a piston for each cylinder, exhaust ports in the larger cylinder adapted to be uncovered by its piston, intake ports in the smaller cylinder adapted to be uncovered by its piston, said intake ports in the successive cylinders being opened and closed in succession, a fuel-supply chamber located within said case and connected with each of the intake ports, a chamber for receiving the exhaust from each pair of cylinders and located within said case and surrounding said fuel-supply chamber, a series of pumps operating to continuously supply said supply chamber with vaporized fuel and air and for forcing the gasified fuel from said supply chamber into the cylinder having its intake ports open whereby the fuel gases in the cylinder are caused to rush over the surface of the cylinder.

40. A gas engine including in combination, a fixed shaft, a crank carried thereby, a supporting case mounted to rotate about the shaft as a center, a series of pairs of cylinders carried by said case and projecting therefrom, said cylinders in each pair being located side by side and having their axes disposed radially of the case and at equal angular intervals, pistons in each cylinder, piston rods connecting the pistons to the crank, one of said cylinders being of smaller cross sectional area than the other, intake ports in said smaller cylinder adapted to be uncovered by its piston, exhaust ports in the larger cylinder adapted to be uncovered by its piston, means for connecting the cylinders in each pair whereby the expanding gases simultaneously act on both pistons, said intake ports being adapted to open and close in succession in one cylinder after the other, a fuel-supply chamber located in and rotating with said case and connected to all of said intake ports and means for heating said fuel supply chamber.

41. A gas engine including in combination, a fixed shaft, a crank carried thereby, a supporting case mounted to rotate about the shaft as a center, a series of pairs of cylinders carried by said case and projecting therefrom, said cylinders in each pair being located side by side and having their axes disposed radially of the case and at equal angular intervals, pistons in each cylinder, piston rods connecting the pistons to the crank, one of said cylinders being of smaller cross sectional area than the other, intake ports in said smaller cylinder adapted to be uncovered by its piston, exhaust ports in the larger cylinder adapted to be uncovered by its piston, means for connecting the cylinders in each pair whereby the expanding gases simultaneously act on both pistons, said intake ports being adapted to open and close in succession in one cylinder after the other, a fuel-supply chamber located in said case and connected to all of said intake ports, and means for supplying said supply chamber with a continuous flow of vaporized fuel and air.

42. A gas engine including in combination, a fixed shaft, a crank carried thereby, a supporting case mounted to rotate about the shaft as a center, a series of pairs of cylinders carried by said case and projecting therefrom, said cylinders in each pair being located side by side and having their axes disposed radially of the case and at equal angular intervals, pistons in each cylinder, piston rods connecting the pistons to the crank, one of said cylinders being of smaller cross sectional area than the other, intake ports in said smaller cylinder adapted to be uncovered by its piston, exhaust ports in the larger cylinder adapted to be uncovered by its piston, means for connecting the cylinders in each pair whereby the expanding gases simultaneously act on both pistons, said intake ports being adapted to open and close in succession in one cylinder after the other, a fuel-supply chamber located in said case and connected to all of said intake ports, means for supplying said supply chamber with a continuous flow of vaporized fuel and air, and means for utilizing the exhaust gases for heating said fuel-supply chamber.

43. A gas engine including in combination, a fixed shaft, a crank carried thereby, a supporting case mounted to rotate about the shaft as a center, a series of pairs of cylinders carried by said case and projecting therefrom, said cylinders in each pair being located side by side and having their axes disposed radially of the case and at equal angular intervals, pistons in each cylinder, piston rods connecting the pistons to the crank, one of said cylinders being of smaller cross sectional area than the other, intake ports in said smaller cylinder adapted to be uncovered by its piston, exhaust ports in the larger cylinder adapted to be uncovered by its piston, means for connecting the cylinders in each pair whereby the expanding gases simultaneously act on both pistons, a fuel-supply chamber in said case connected to each of said intake ports, a chamber surrounding said supply chamber and located within said case for receiving the exhaust gases from all of said cylinders.

44. A gas engine including in combination, a fixed shaft, a crank carried thereby, a supporting case mounted to rotate about the shaft as a center, a series of pairs of cylinders carried by said case and projecting therefrom, said cylinders in each pair being located side by side and having their axes disposed radially of the case and at equal angular intervals, pistons in each cylinder, piston rods connecting the pistons to the crank, one of said cylinders being of smaller cross sectional area than the other, intake ports in said smaller cylinder adapted to be uncovered by its piston, exhaust ports in the larger cylinder adapted to be uncovered by its piston, means for connecting the cylinders in each pair whereby the expanding gases simultaneously act on both pistons, a fuel-supply chamber in said case connected to each of said intake ports, a chamber surrounding said supply chamber and located within said case for receiving the exhaust gases from all of said cylinders, and mechanical means for supplying said supply chamber with a continuous flow of vaporized fuel and air.

45. A gas engine including in combination, a fixed shaft, a crank carried thereby, a supporting case mounted to rotate about the shaft as a center, a series of pairs of cylinders carried by said case and projecting therefrom, said cylinders in each pair being located side by side and having their axes disposed radially of the case and at equal angular intervals, pistons in each cylinder, piston rods connecting the pistons to the crank, one of said cylinders being of smaller cross sectional area than the other, intake ports in said smaller cylinder adapted to be uncovered by its piston, exhaust ports in the larger cylinder adapted to be uncovered by its piston, means for connecting the cylinders in each pair whereby the expanding gases simultaneously act on both pistons, a fuel-supply chamber within said case and connected to each of said intake ports, a chamber surrounding said fuel-supply chamber and adapted to receive the exhaust gases, a series of pumps, means for connecting said pumps to the supply chamber whereby said pumps are continuously supplying vaporized fuel and air to said supply chamber.

46. A gas engine including in combination, a fixed shaft, a crank carried thereby, a supporting case mounted to rotate about the shaft as a center, a series of pairs of cylinders carried by said case and projecting therefrom, said cylinders in each pair being located side by side and having their axes disposed radially of the case and at equal angular intervals, pistons in each cylinder, piston rods connecting the pistons to the crank, one of said cylinders being of smaller cross sectional area than the other, intake ports in said smaller cylinder adapted to be uncovered by its piston, exhaust ports in the larger cylinder adapted to be uncovered by its piston, means for connecting the cylinders in each pair whereby the expanding gases simultaneously act on both pistons, means for supplying gasified fuel to said intake ports, including a series of pump cylinders, a piston in each cylinder, piston rods connecting the pistons to the crank, a supply chamber common to all of said intake ports and common to all of said pump cylinders, and means for connecting the pump cylinders to the supply chamber in succession whereby the contents of the pump cylinders may be transferred to the supply chamber.

47. A gas engine including in combination, a rotating supporting case, a plurality of pairs of cylinders carried thereby and projecting from said case whereby they may be air cooled, said cylinders being arranged side by side and having their longitudinal axes disposed radially of the case and at equal angular intervals, a fixed shaft having a crank about which shaft said case rotates, means for connecting the outer ends of each pair of cylinders, one of said cylinders in each pair being substantially half the cross sectional area as the other cylinder, a piston in each cylinder, piston rods connecting the pistons to the crank, said smaller cylinder having intake ports, the combined area of which is substantially equal to the cross sectional area of the cylinder and disposed so as to be uncovered by the piston, said larger cylinder having exhaust ports, the combined area of which is substantially equal to the cross sectional area of the cylinder containing the exhaust ports, said exhaust ports adapted to be uncovered by the piston of said cylinder, a spark plug adjacent the outer end of the smaller cylinder, a supply chamber located in said case and connected to all of said intake ports, a chamber surrounding said supply chamber and connected to all of said exhaust ports, and mechanically operated means for supplying said fuel-supply chamber.

48. A gas engine including in combination, a rotating supporting case, a plurality of pairs of cylinders carried thereby and projecting from said case whereby they may be air cooled, said cylinders being arranged side by side and having their longitudinal axes disposed radially of the case and at equal angular intervals, a fixed shaft having a crank, about which shaft said case rotates, means for connecting the outer ends of each pair of cylinders, one of said cylinders in each pair being substantially half the cross sectional area as the other cylinder, a piston in each cylinder, piston rods connecting the pistons to the crank, said smaller cylinder having intake ports, the combined area of which is substantially equal to the cross sectional area of the cylinder and disposed so as to be uncovered by the piston, said larger cylinder having exhaust ports, the combined area of which is substantially equal to the cross sectional area of the cylinder containing the exhaust ports, said exhaust ports adapted to be uncovered by the piston of said cylinder, a spark plug adjacent the outer end of the smaller cylinder, a supply chamber located in said case and connected to all of said intake ports, a chamber surrounding said supply chamber and connected to all of said exhaust ports, a series of pump cylinders carried by said case, a piston in each pump cylinder, a piston rod connecting said pump pistons to the crank, said crank having an eccentric portion whereby the relative movement of the pump pistons and cylinders is less than the relative movement of the engine pistons and cylinders, and means for connecting the pump cylinders to the fuel-supply chamber when said pump cylinders are forcing the vaporized fuel and air contained therein out of the pump cylinders.

49. A gas engine including in combination, a shaft, a crank formed thereon, a rotating supporting case, a plurality of radially arranged cylinders carried by said supporting casing, a piston for each cylinder, a piston rod connecting each piston to said crank, the connection between the piston rods and crank including concentric floating sleeves located on said crank and one within the other, and means for holding the piston rods in alinement with the center of the crank.

50. A gas engine including in combination, a shaft, a crank formed thereon, a rotating supporting case, a plurality of radially arranged cylinders carried by said supporting case, a piston in each cylinder, a piston rod connected to each piston and to said crank, the connection between the piston rods and crank including a cross bar connected to each piston rod, a ring carried by each cross bar, said rings on the several cross bars being staggered so as to be arranged side by side, and concentric floating sleeves located on said crank within said rings.

51. A gas engine including in combination, a shaft, a crank formed therein, a rotating supporting case, a plurality of radially arranged cylinders carried by said supporting case, a piston in each cylinder, a piston rod connected to each piston and to said crank, the connection between the piston rods and crank including a cross bar connected to each piston rod, a ring carried by each cross bar, said rings on the several cross bars being staggered so as to be arranged side by side, concentric floating sleeves located on said crank within said rings, an idle ring on said floating sleeves of slightly larger diameter than the rings carried by the cross bar, whereby the thrust of the active cross bar against the floating sleeves is taken up by said idle ring.

52. A gas engine including in combination, a shaft, a crank formed therein, a rotating supporting case, a plurality of radially arranged cylinders carried by said supporting case, a piston in each cylinder, a piston rod connected to each piston and to said crank, the connection between the piston rods and crank including a cross bar connected to each piston rod, a ring carried by each cross bar, said rings on the several cross bars being staggered so as to be arranged side by side, concentric floating sleeves located on said crank within said rings, and cap rings surrounding the ends of said cross bars whereby centrifugal force acting upon opposed pistons will be counterbalanced.

53. A gas engine including in combination, a shaft, a crank formed therein, a rotating supporting case, a plurality of radially arranged cylinders carried by said supporting case, a piston in each cylinder, a piston rod connected to each piston and to said crank, the connection between the piston rods and crank including a cross bar connected to each piston rod, a ring carried by each cross bar, said rings on the several cross bars being staggered so as to be arranged side by side, concentric floating sleeves located on said crank within said rings, an idle ring on said floating sleeves of slightly larger diameter than the rings carried by the cross bar, whereby the thrust of the active cross bar against the floating sleeves is taken up by said idle ring, and cap rings surrounding the ends of the cross bars and connecting the same whereby the centrifugal force acting upon opposed pistons will be counterbalanced.

54. A gas engine including in combination, a shaft, a crank formed therein, a rotating supporting case surrounding the shaft, a plurality of cylinders carried by the supporting case, said cylinders having their axes radially disposed and arranged at equal angular intervals, a chamber located within said case for receiving the exhaust gases from all of the cylinders, an exhaust pipe connected to said chamber, funnels carried by the case, passages extending through the case whereby the air collected by the funnels is directed centrally through the engine in and about the crank and into and out through the exhaust pipe for creating a vacuum in the chamber receiving the exhaust gases.

55. A gas engine including in combination, a rotating supporting case, a fixed shaft, a crank carried thereby, a plurality of pairs of cylinders carried by the rotating case, pistons in the cylinders, rods connecting the pistons with the crank, means for connecting the cylinders in each pair, one of said cylinders having intake ports, the other cylinder having exhaust ports, an exhaust pipe, means for connecting the exhaust pipe to the exhaust ports, and devices for collecting air as the case rotates and forcing the same out through the delivery end of the exhaust pipe for creating a vacuum to facilitate the scavenging of the burnt gases from the cylinders.

56. A gas engine including in combination, a fixed shaft having a recess centrally thereof, a supporting case mounted to rotate about said shaft, a plurality of pairs of cylinders carried by said supporting case and projecting therefrom, a piston in each cylinder, a piston rod connecting each cylinder to the crank, means for connecting the cylinders in each pair, intake ports for one of said cylinders adapted to be uncovered by its piston, exhaust ports for the other cylinder of each pair adapted to be uncovered by its piston, said recess in the shaft extending through the crank, a supply chamber for supplying gasified fuel to all of said intake ports, means for connecting the recess in the shaft to the supply chamber, and means for supplying cold vaporized fuel and air to said recess in the shaft.

57. A gas engine including in combination, a fixed shaft having a recess centrally thereof, a supporting case mounted to rotate about said shaft, a plurality of pairs of cylinders carried by said supporting case and projecting therefrom, a piston in each cylinder, a piston rod connecting each cylinder to the crank, means for connecting the cylinders in each pair, intake ports for one of said cylinders adapted to be uncovered by its piston, exhaust ports for the other cylinder of each pair adapted to be uncovered by its piston, said recess in the shaft extending through the crank, a supply chamber for supplying gasified fuel to all of said intake ports, means for connecting the recess in the shaft to the supply chamber, means for supplying cold vaporized fuel and air to said recess in the shaft, and mechanical means arranged between the recess and shaft and the supply chamber for drawing the vaporized fuel and air from the recess and delivering the same to the supply chamber.

58. A gas engine including in combination, a fixed shaft having a recess centrally thereof, a supporting case mounted to rotate about said shaft, a plurality of pairs of cylinders carried by said supporting case and projecting therefrom, a piston in each cylinder, a piston rod connecting each cylinder to the crank, means for connecting the cylinders in each pair, intake ports for one of said cylinders adapted to be uncovered by its piston, exhaust ports for the other cylinder of each pair adapted to be uncovered by its piston, said recess in the shaft extending through the crank, a supply chamber for supplying gasified fuel to all of said intake ports, means for connecting the recess in the shaft to the supply chamber, means for supplying cold vaporized fuel and air to said recess in the shaft, mechanical means arranged between the recess and shaft and the supply chamber for drawing the vaporized fuel and air from the recess and delivering the same to the supply chamber, and a chamber surrounding said supply chamber and connected to each of the exhaust ports.

59. A gas engine including in combination, a fixed shaft having a recess centrally thereof, a supporting case mounted to rotate about said shaft, a plurality of pairs of cylinders carried by said supporting case and projecting therefrom, a piston in each cylinder, a piston rod connecting each cylinder to the crank, means for connecting the cylinders in each pair, intake ports for one of said cylinders adapted to be uncovered by its piston, exhaust ports for the other cylinder of each pair adapted to be uncovered by its piston, said recess in the shaft extending through the crank, a supply chamber for supplying gasified fuel to all of the intake ports, means for connecting the recess in the shaft to the supply chamber, means for supplying cold vaporized fuel and air to said recess in the shaft, mechanical means arranged between the recess and shaft and the supply chamber for drawing the vaporized fuel and air from the recess and delivering the same to the supply chamber, a chamber surrounding said supply chamber and connected to each of the exhaust ports, an exhaust pipe connected with said chamber receiving the exhaust gases, said case having means for collecting air and forcing the air about the crank and out through the exhaust pipe whereby a vacuum is created in the chamber receiving the exhaust gases from the cylinders.

60. A gas engine including in combination, a fixed shaft having a recess centrally thereof, a supporting case mounted to rotate about said shaft, a plurality of pairs of cylinders carried by said supporting case and projecting therefrom, a piston in each cylinder, a piston rod connecting each cylinder to the crank, means for connecting the cylinders in each pair, intake ports for one of said cylinders adapted to be uncovered by its piston, exhaust ports for the other cylinder of each pair adapted to be uncovered by its piston, said recess in the shaft extending through the crank, a supply chamber for supplying gasified fuel to all of said intake ports, means for connecting the recess in the shaft to the supply chamber, means for supplying cold vaporized fuel and air to said recess in the shaft, oil pipes extending through the recess in the shaft to the crank and to the bearings for the shaft, said crank having openings for directing the oil to the outer face thereof.

61. A gas engine including in combination, a plurality of cylinders, each having an intake port, a piston in each cylinder, a fuel supply chamber connected to all of said intake ports substantially at one end of said chamber, means for supplying said fuel supply chamber with a continuous flow of vaporized fuel and air substantially at the other end of said fuel supply chamber, a heating chamber surrounding said fuel supply chamber from end to end thereof and adapted to receive the exhaust gases from the cylinders at the end of the fuel supply chamber opposite the end receiving the fuel gases and air.

62. A gas engine including in combination, a rotating casing, a plurality of radially disposed cylinders carried thereby, said supporting casing having a fuel supply chamber connected at one end to the cylinders, means for supplying said fuel supply chamber with vaporized fuel and air at the opposite end of said chamber, a chamber surrounding the fuel supply chamber and receiving the exhaust gases from the cylinders at the end thereof opposite the end of the supply chamber where the fuel gas and air is received.

63. A gas engine including in combination, a cylinder, a piston therein, a fuel-supply chamber adjacent the cylinder, means for supplying said chamber with a mixture of vaporized fuel and air, means for heating said chamber for gasifying the fuel and air prior to supplying the same to the cylinder, means for utilizing the exhaust gases from the cylinder for heating the supply chamber, and means providing for a continuous passage of air through the engine to create a vacuum in the engine to facilitate the scavenging of the cylinder.

64. A gas engine including in combination, a cylinder, a piston therein, a fuel-supply chamber adjacent the cylinder, means for supplying said chamber with a mixture of vaporized fuel and air, means for heating said chamber for gasifying the fuel and air prior to supplying the same to the cylinder, means for utilizing the exhaust gases from the cylinder for heating the supply chamber, and means providing for a continuous passage of air through the engine to create a vacuum in the engine to facilitate the scavenging of the cylinder and for cooling the engine bearings.

65. A gas engine including in combination, a rotatably mounted supporting case, a cylinder carried by said case, pistons mounted in the cylinder, a fuel-supply chamber adjacent the cylinder, means for supplying said chamber with a mixture of vaporized fuel and air, means for heating said chamber to gasify the fuel and air prior to supplying the same to the cylinder, and means whereby the direction of rotation of the case may be reversed.

66. A rotary gas engine including in combination, a rotating case, a piston therein, a fuel-supply chamber within the case and into which said cylinder projects, means for supplying said chamber with a mixture of vaporized fuel and air, a chamber surrounding the fuel-supply chamber to receive the exhaust gases from the cylinder, the exhaust gases in the second mentioned chamber heating the supply chamber for gasifying the vaporized fuel and air prior to supplying the same to the cylinder.

67. A rotary gas engine including in combination, a crank shaft, a pair of cylinders having connection with each other, one cylinder being of smaller cross sectional diameter than the other and both mounted to revolve about said crank shaft, the smaller cylinder having inlet ports and the larger cylinder having exhaust ports, pistons mounted in the cylinders and having connection with the crank shaft, means for supplying an explosive fluid to the smaller cylinder, an ignition means, means for utilizing the exhausted gases from the larger cylinder for heating the explosive fluid prior to supplying the same to the smaller cylinder, and means to direct air through the engine in and about the crank for creating a vacuum in the engine to aid in the discharge of the exhaust gases.

68. A gas engine including in combination, a rotating case, a cylinder mounted in the case, a piston in the cylinder, a fuel-supply chamber adjacent the cylinder, means for supplying said chamber with a mixture of vaporized fuel and air, a chamber substantially surrounding the supply chamber to receive the exhaust gases from the cylinder whereby the exhausted gases may be utilized as a working force for gasifying and expanding the mixed fuel vapor and air prior to supplying the same to the cylinder.

69. A gas engine including in combination, a rotary case, a cylinder mounted in the case, a piston in the cylinder, a fuel-supply chamber adjacent the cylinder, means for supplying said chamber with a mixture of vaporized fuel and air, a chamber substantially surrounding the supply chamber to receive the exhaust gases from the cylinder whereby the explosive gases may be utilized as a working force for gasifying and expanding the mixed fuel vapor and air prior to supplying the same to the cylinder, and devices rotating with the case and cylinder to direct air into and through the case of the engine to cause a vacuum capable of facilitating the rapid scavenging of the cylinder.

70. A gas engine including in combination, a fixed crank shaft having a crank, a supporting case, a plurality of cylinders carried by said supporting case, a piston in each cylinder, and a piston rod connected to each piston and having a floating connection with said crank, said floating connection including concentric sleeves located one within the other, and means for maintaining said piston rods in alinement with the center of the crank.

71. A gas engine including in combination, a fixed crank shaft having a crank, a supporting case, a plurality of cylinders carried by said supporting case, a piston in each cylinder, a piston rod connected to each piston and having a floating connection with said crank, said floating connection including concentric sleeves located one within the other, means for maintaining said piston rods in alinement with the center of the crank, and means connected to said floating connections whereby the centrifugal force acting upon opposed pistons will be counterbalanced.

72. A gas engine including in combination, a rotating case, including an end cap and a ported ring, the cap and ring having annular grooves on their inner faces, annular partition walls supported in said grooves for expansion therein, said walls forming supply and exhaust chambers, means for supplying fluid to the supply chamber, and ignition means.

73. A gas engine including in combination, a cylindrical case, a fixed shaft projecting into said case and having an offset crank, cap plates for closing the ends of said case, a plurality of cylinders carried by the case and radially arranged relative thereto, a piston in each cylinder, a piston rod for each piston connected to said offset crank, an annular partition extending from one end of the case to the other for forming a fuel supply chamber common to the intake ports of all of the cylinders.

74. A gas engine including in combination, a cylindrical case, a fixed shaft projecting into said case and having an offset crank, cap plates for closing the ends of said case, a plurality of cylinders carried by the case and radially arranged relative thereto, a piston in each cylinder, a piston rod for each piston connected to said offset crank, an annular partition extending from one end of the case to the other and forming a fuel supply chamber common to the intake ports of all of the cylinders, a second annular partition between the first annular partition and the outer wall of the case for forming a chamber extending from end to end of the case adapted to receive the exhaust gases from the cylinders whereby the heat of the exhaust gases may be used for heating the fuel supply chamber.

75. A gas engine including in combination a rotating cylindrical case, a fixed shaft projecting into the case and having an offset crank, cap plates carried by the case and having bearings for the shaft whereby said case may be rotated about the shaft, a plurality of pairs of radially arranged cylinders carried by the case, said cylinders projecting into the case, a piston for each cylinder, piston rods connected to the pistons and the crank, an annular partition located within the case and extending from end to end thereof for forming a fuel supply chamber, one cylinder of each pair having intake ports uncovered by its piston and means for connecting said intake ports with the fuel supply chamber.

76. A gas engine including in combination, a rotating cylindrical case, a fixed shaft projecting into the case and having an offset crank, cap plates carried by the case and having bearings for the shaft whereby said case may be rotated about the shaft, a plurality of pairs of radially arranged cylinders carried by the case, said cylinders projecting into the case, a piston for each cylinder, piston rods connected to the pistons and the crank, an annular partition located within the case and extending from end to end thereof for forming a fuel supply chamber, one cylinder of each pair having intake ports uncovered by its piston and means for connecting said intake ports with the fuel supply chamber, a second annular partition extending from end to end of the case and located between the first named partition and the case for forming a chamber to receive the exhaust gases from the cylinders.

77. A gas engine including in combination, a rotating cylindrical case, a ported ring at one end thereof, a cap plate attached to the outer face of the ring, a cap plate for closing the other end of the case, a fixed shaft extending through the ported ring and having an offset crank in the case, a plurality or radially disposed cylinders carried by the case, a piston in each cylinder, piston rods connecting the pistons with the crank, spaced annular partitions extending from the cap plate to the ported ring for forming a fuel supply chamber and an exhaust receiving chamber located outside of the fuel supply chamber, a series of pumps, ports located in said ring for supplying said pumps with fuel gas and air and ports in said ring for connecting the pumps with the fuel supply chamber whereby the pumps are adapted to draw in the fuel gas and air and transmit the same to the fuel supply chamber.

78. A gas engine including in combination, a rotating cylindrical case, a ported ring at one end of said case, a cap plate adjacent said ported ring, a cap plate for closing the other end of the case, a fixed shaft extending through the ported ring and the cap plate adjacent thereto, said shaft having a bearing in the other cap plate and an offset crank located within the case, a plurality of radially arranged cylinders carried by said case, a piston in each cylinder, piston rods connecting the pistons to the crank, a plurality of radially arranged pumps each including a piston and pitmen connecting the pump pistons with the crank.

79. A gas engine including in combination, a rotating cylindrical case, a ported ring at one end of said case, a cap plate adjacent said ported ring, a cap plate for closing the other end of the case, a fixed shaft extending through the ported ring and the cap plate adjacent thereto, said shaft having a bearing in the other cap plate and an offset crank located within the case, a plurality of radially arranged cylinders carried by said case, a piston in each cylinder, piston rods connecting the pistons to the crank, a plurality of radially arranged pumps each including a piston and pitmen connecting the pump pistons with the crank, said crank having an eccentrically disposed enlarged portion engaged by the pitmen of the pump cylinders whereby the throw of the pump pistons is less than the throw of the pistons in the engine cylinders.

80. A gas engine including in combination, a rotating cylindrical case, a cap plate for closing one end of said case a ported ring at the other end of said case, a cap plate at the outer face of said ported ring, a fixed shaft extending through the ported ring and cap plate adjacent thereto into said case, said shaft having an offset crank, spaced annular partitions extending from the ported ring to the other end of the case, a plurality of pairs of cylinders carried by the case and extending through said annular partitions, a piston for each cylinder, pitmen connecting the pistons to the crank, means for connecting the piston chambers of the cylinders at their outer ends, one of said cylinders of each pair having intake ports uncovered by its piston and the other exhaust ports uncovered by its piston, means for connecting the intake ports with the chamber between the annular partitions, the exhaust ports being connected to the chamber outside the annular partitions and means for supplying fuel gas and air through said ported ring to said chamber between the annular partitions.

In testimony whereof I affix my signature.

BENJAMIN F. AUGUSTINE.